US011609880B1

(12) United States Patent
Amancharla et al.

(10) Patent No.: US 11,609,880 B1
(45) Date of Patent: Mar. 21, 2023

(54) SERVER FOR INGESTING AND RENDERING DATA OBJECTS

(71) Applicant: Groupon, inc., Chicago, IL (US)

(72) Inventors: Ramya Amancharla, San Francisco, CA (US); Anthony Caliendo, Chicago, IL (US); Brian David Fields, Glencoe, IL (US); James J. Sullivan, Piedmont, CA (US); Kyle Oppenheim, San Francisco, CA (US); Rajat Shroff, Redwood Shores, CA (US)

(73) Assignee: Groupon, Inc., Chicago, IL (US)

( * ) Notice: Subject to any disclaimer, the term of this patent is extended or adjusted under 35 U.S.C. 154(b) by 638 days.

(21) Appl. No.: 15/856,707

(22) Filed: Dec. 28, 2017

Related U.S. Application Data

(60) Provisional application No. 62/440,702, filed on Dec. 30, 2016.

(51) Int. Cl.
G06F 7/00 (2006.01)
G06F 16/174 (2019.01)
G06F 3/06 (2006.01)
G06F 11/14 (2006.01)
G06F 16/23 (2019.01)
G06F 16/21 (2019.01)

(52) U.S. Cl.
CPC ........ G06F 16/1748 (2019.01); G06F 3/0608 (2013.01); G06F 11/1435 (2013.01); G06F 16/219 (2019.01); G06F 16/23 (2019.01)

(58) Field of Classification Search
CPC .... G06F 16/1748; G06F 16/219; G06F 16/23; G06F 3/0608; G06F 11/1435

USPC ................... 707/687, 708, 999.01
See application file for complete search history.

(56) References Cited

U.S. PATENT DOCUMENTS

| 5,892,900 | A | 4/1999 | Ginter et al. |
|---|---|---|---|
| 9,471,701 | B2 | 10/2016 | Tsolis |
| 10,817,831 | B1 | 10/2020 | Polyanskiy |
| 2003/0093321 | A1* | 5/2003 | Bodmer ............. G06Q 30/0613 705/26.41 |
| 2011/0264555 | A1* | 10/2011 | Turner-Rielle ........ G06Q 30/06 705/26.8 |
| 2011/0302485 | A1* | 12/2011 | D'Angelo ............. G06F 16/972 715/234 |
| 2013/0054544 | A1 | 2/2013 | Li et al. |
| 2014/0006069 | A1 | 1/2014 | Guggenheim |
| 2014/0052571 | A1 | 2/2014 | Raman |
| 2014/0188601 | A1 | 7/2014 | Buset et al. |
| 2015/0310536 | A1 | 10/2015 | Brady et al. |
| 2017/0192860 | A1 | 7/2017 | Vijayan et al. |
| 2017/0278019 | A1 | 9/2017 | Aragone et al. |
| 2018/0012290 | A1 | 1/2018 | Houston et al. |
| 2018/0018235 | A1 | 1/2018 | Arslan et al. |

(Continued)

FOREIGN PATENT DOCUMENTS

KR 10-2011-0023987 A 3/2011

OTHER PUBLICATIONS

Ron White, How Computers Work, Oct. 2003, QUE, 7th Edition (Year: 2003).

*Primary Examiner* — Md I Uddin
(74) *Attorney, Agent, or Firm* — Alston & Bird LLP

(57) ABSTRACT

Systems and methods are provided to ingest and integrate data objects for use in one or more system operations including providing a renderable data object to a user and updating a data item database.

16 Claims, 21 Drawing Sheets

(56) References Cited

U.S. PATENT DOCUMENTS

2018/0341667 A1 11/2018 Gluzman et al.
2019/0187864 A1 6/2019 Yeh et al.
2021/0287268 A1 9/2021 Bousis et al.

\* cited by examiner

SERVER FOR INGESTING AND RENDERING DATA OBJECTS

CROSS-REFERENCE TO RELATED APPLICATIONS

This application claims the benefit of U.S. Provisional Application No. 62/440,702 filed Dec. 30, 2016, the entirety of which is herein incorporated by reference.

BACKGROUND

Various embodiments of the present invention relate generally to systems that ingest and integrate data objects for use in one or more system operations. Applicant has identified a number of deficiencies and problems associated with integrating, validating, and updating such data objects. Through applied effort, ingenuity, and innovation, many of these identified problems have been solved by developing solutions that are included in embodiments of the present invention, many examples of which are described in detail herein.

BRIEF SUMMARY

Systems and methods are therefore provided in accordance with example embodiments.

Some embodiments may include methods, while other embodiments may include systems and apparatuses including circuitry and/or media configured to implement the methods and/or other functionality discussed herein. For example, one or more processors, and/or other machine components is configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

In one example embodiment, an ingestion system comprising an ingestion module, a flat file module, a compliance module, and a deduplication module is provided. In some examples, the ingestion module comprises an ingestion processor and an ingestion memory including ingestion computer program code, the ingestion memory and the ingestion computer program code configured to, with the ingestion processor, cause the ingestion module to: transmit a poll request to the flat file module requesting a flat file data object; receive the flat file data object, wherein the flat file data object contains at least one of strings, integers, Booleans, objects, arrays of objects, arrays of Booleans, arrays of strings, or arrays of integers; parse the flat file data object into a renderable data object comprising an array of parts according to defined properties for ingesting the flat file data object; transmit the renderable data object to the compliance module and the deduplication module; and store the renderable data object in a renderable object database; the flat file module comprises a flat file processor and a flat file memory including flat file computer program code, the flat file memory and the flat file computer program code configured to, with the flat file processor, cause the flat file module to: receive the poll request from the ingestion module; and transmit the flat file data object to the ingestion module; the compliance module comprises a compliance processor and a compliance memory including compliance computer program code, the compliance memory and the compliance computer program code configured to, with the compliance processor, cause the compliance module to: determine compliance of the renderable data object by comparing each part of the array of parts with object constraints in the defined properties to identify one or more non-compliant parts of the renderable data object; determine a compliance alert that identifies the one or more non-compliant parts of the renderable data object; and transmit the compliance alert to the flat file module; and the deduplication module comprises a deduplication processor and a deduplication memory including deduplication computer program code, the deduplication memory and the deduplication computer program code configured to, with the deduplication processor, cause the deduplication module to: identify one or more candidate duplicate parts from the array of parts; compare the candidate duplicate parts from the array of parts with a part registry stored to a deduplication database to generate a duplication score for the renderable data object; and output the duplication score for the renderable data object.

In one example, the compliance module is further configured to determine one or more compliance solutions for each of the one or more non-compliant parts, wherein the one or more compliance solutions comprise a change to the renderable data object or the flat file data object that will make the one or more non-compliant parts compliant; and wherein determining the compliance alert further comprises including the one or more compliance solutions for each of the one or more non-compliant parts in the compliance alert.

In one example, the compliance module is further configured to determine a compliance action for each of the one or more compliance solutions, wherein the compliance action, when executed by the compliance module changes the renderable data object such that the one or more non-compliant parts become compliant; and update the renderable data object according to the compliance action.

In one example, the flat file module is further configured to receive the compliance alert from the compliance module; and update the flat file data object according to the one or more compliance solutions received in association with the compliance alert.

In one example, the deduplication module is further configured to determine from the duplication score a deduplication action; determine a deduplication recommendation, wherein the deduplication recommendation comprises a change to the flat file data object, by the flat file module, that will lower the duplication score; determine a duplicate alert that identifies the duplication score, the deduplication action, and the deduplication recommendation; and transmit the duplicate alert to the flat file module.

In one example, the deduplication action comprises one of update, by the deduplication module, the renderable data object with an indication as an alternate renderable data object; or update, by the deduplication module, the renderable data object with an indication as a rejected renderable data object; and where the deduplication module is configured update the renderable data object according to the deduplication action.

In one example, the flat file module is further configured to receive the deduplication recommendation from the deduplication module; and update the flat file data object according to the deduplication recommendation.

In one example, the deduplication module is further configured to output the renderable data object and the duplication score for the renderable data object to the ingestion module.

In one example the renderable object database comprises an external renderable object database.

In one example, the flat file module, in response to the poll request from the ingestion module, is further configured to determine the flat file data object from a data item stored in a data item database, wherein the flat file data object is parsed into the renderable data object representing the data item; and transmit the flat file data object to the ingestion module.

In one example, the flat file module is further configured to identify a data item change stored in the data item database, after transmitting the flat file data object to the ingestion module; determine a feed update indicating the data item change; and cause an update to a previously ingested renderable data object by transmitting an updated flat file data object with the feed update.

In one example, the ingestion module is further configured to receive the updated flat file data object from the flat file module; and update the previously ingested renderable data object according to the updated flat file data object.

In one example, the flat file module is further configured to cause a removal of a previously ingested renderable data object from the renderable object database by generating a removal signal identifying the previously ingested renderable data object and transmitting the removal signal to the ingestion module.

In one example, the ingestion module is further configured to receive, from the flat file module, a removal signal identifying a previously ingested renderable data object; and remove the previously ingested renderable data object from the renderable object database.

In one example embodiment, a method for ingesting a data object is provided. In one example, the method includes: transmitting, by an ingestion module, a poll request to a flat file module requesting a flat file data object; receiving, by the flat file module, the poll request from the ingestion module; transmitting, by the flat file module, the flat file data object to the ingestion module; receiving, by the ingestion module, the flat file data object, wherein the flat file data object contains at least one of strings, integers, Booleans, objects, arrays of objects, arrays of Booleans, arrays of strings, or arrays of integers; parsing, by the ingestion module, the flat file data object into a renderable data object comprising an array of parts according to defined properties for ingesting the flat file data object; transmitting, by the ingestion module, the renderable data object to a compliance module and a deduplication module; determining, by the compliance module, compliance of the renderable data object by comparing each part of the array of parts with object constraints in the defined properties to identify one or more non-compliant parts of the renderable data object; determining, by the compliance module, a compliance alert that identifies the one or more non-compliant parts of the renderable data object; transmitting, by the compliance module, the compliance alert to the flat file module; identifying, by the deduplication module, one or more candidate duplicate parts from the array of parts; comparing, by the deduplication module, the candidate duplicate parts from the array of parts with a part registry stored to a deduplication database to generate a duplication score for the renderable data object; and outputting, by the deduplication module, the duplication score for the renderable data object; and storing, by the ingestion module, the renderable data object in a renderable object database.

In one example, the method further includes: determining, by the compliance module, one or more compliance solutions for each of the one or more non-compliant parts, wherein the one or more compliance solutions comprise a change to the renderable data object or the flat file data object that will make the one or more non-compliant parts compliant; and wherein determining the compliance alert further comprises including the one or more compliance solutions for each of the one or more non-compliant parts in the compliance alert.

In one example, the method further includes: determining, by the compliance module, a compliance action for each of the one or more compliance solutions, wherein the compliance action, when executed by the compliance module changes the renderable data object such that the one or more non-compliant parts become compliant; and updating, by the compliance module, the renderable data object according to the compliance action.

In one example, the method further includes: receiving, by the flat file module, the compliance alert from the compliance module; and updating, by the flat file module, the flat file data object according to the one or more compliance solutions received in association with the compliance alert.

In one example, the method further includes determining, by the deduplication module and from the duplication score, a deduplication action; determining, by the deduplication module, a deduplication recommendation, wherein the deduplication recommendation comprises a change to the flat file data object, by the flat file module, that will lower the duplication score; determining, by the deduplication module, a duplicate alert that identifies the duplication score, the deduplication action, and the deduplication recommendation; and transmitting, by the deduplication module, the duplicate alert to the flat file module.

In one example, the deduplication action comprises one of: update, by the deduplication module, the renderable data object with an indication as an alternate renderable data object; or update, by the deduplication module, the renderable data object with an indication as a rejected renderable data object; and wherein the method further comprises updating, by the deduplication module, the renderable data object according to the deduplication action.

In one example, the method further includes receiving, by the flat file module, the deduplication recommendation from the deduplication module; and updating, by the flat file module, the flat file data object according to the deduplication recommendation.

In one example, the method further includes outputting, by the deduplication module, the renderable data object and the duplication score for the renderable data object to the ingestion module.

In one example the renderable object database comprises an external renderable object database.

In one example, the method further includes determining, by the flat file module and in response to the poll request from the ingestion module, the flat file data object from a data item stored in a data item database, wherein the flat file data object is parsed into the renderable data object representing the data item; and transmitting, by the flat file module, the flat file data object to the ingestion module.

In one example, the method further includes identifying, by the flat file module, a data item change stored in the data item database, after transmitting the flat file data object to the ingestion module; determining, by the flat file module, a feed update indicating the data item change; and causing, by the flat file module, an update to a previously ingested renderable data object by transmitting an updated flat file data object with the feed update.

In one example, the method further includes receiving, by the ingestion module, the updated flat file data object from the flat file module; and updating, by the ingestion module, the previously ingested renderable data object according to the updated flat file data object.

In one example, the method further includes causing a removal of a previously ingested renderable data object from the renderable object database by generating, by the flat file module, a removal signal identifying the previously ingested renderable data object and transmitting the removal signal to the ingestion module.

In one example, the method further includes receiving, by the ingestion module and from the flat file module, a removal signal identifying a previously ingested renderable data object; and removing, by the ingestion module, the previously ingested renderable data object from the renderable object database.

In one example embodiment, an apparatus for ingesting a data object is provided. In some examples, the apparatus comprising at least one processor and at least one memory including computer program code, the at least one memory and the computer program code configured to, with the at least one processor, cause the apparatus to transmit a poll request to a flat file server, requesting a flat file data object; receive the flat file data object, wherein the flat file data object contains at least one of strings, integers, Booleans, objects, arrays of objects, arrays of Booleans, arrays of strings, or arrays of integers; parse the flat file data object into a renderable data object comprising an array of parts according to defined properties for ingesting the flat file data object; determine compliance of the renderable data object by comparing each part of the array of parts with object constraints in the defined properties to identify one or more non-compliant parts of the renderable data object; determine a compliance alert that identifies the one or more non-compliant parts of the renderable data object; transmit the compliance alert to the flat file server; identify one or more candidate duplicate parts from the array of parts; compare the candidate duplicate parts from the array of parts with a part registry stored to a deduplication database to generate a duplication score for the renderable data object; and output the duplication score for the renderable data object; and store the renderable data object in a renderable object database.

In one example, the at least one memory and the computer program code are further configured to, with the at least one processor, cause the apparatus to further determine one or more compliance solutions for each of the one or more non-compliant parts, wherein the one or more compliance solutions comprise a change to the renderable data object or the flat file data object that will make the one or more non-compliant parts compliant; and wherein determining the compliance alert further comprises including the one or more compliance solutions for each of the one or more non-compliant parts in the compliance alert.

In one example, the at least one memory and the computer program code are further configured to, with the at least one processor, cause the apparatus to further determine a compliance action for each of the one or more compliance solutions, wherein the compliance action, when executed by the apparatus changes the renderable data object such that the one or more non-compliant parts become compliant; and update the renderable data object according to the compliance action.

In one example, the at least one memory and the computer program code are further configured to, with the at least one processor, cause the apparatus to further determine from the duplication score a deduplication action; determine a deduplication recommendation, wherein the deduplication recommendation comprises a change to the flat file data object, at the flat file server, that will lower the duplication score; determine a duplicate alert that identifies the duplication score, the deduplication action, and the deduplication recommendation; and transmit the duplicate alert to the flat file server.

In one example, the deduplication action comprises one of update the renderable data object with an indication as an alternate renderable data object; or update the renderable data object with an indication as a rejected renderable data object; and wherein the at least one memory and the computer program code are further configured to, with the at least one processor, cause the apparatus to further update the renderable data object according to the deduplication action.

In one example, the at least one memory and the computer program code are further configured to, with the at least one processor, cause the apparatus to further store the renderable data object and the duplication score for the renderable data object in the renderable object database.

In one example, the renderable object database comprises an external renderable object database.

In one example, the at least one memory and the computer program code are further configured to, with the at least one processor, cause the apparatus to further receive an updated flat file data object from the flat file server; and update a previously ingested renderable data object according to the updated flat file data object.

In one example, the at least one memory and the computer program code are further configured to, with the at least one processor, cause the apparatus to further receive, from the flat file server, a removal signal identifying a previously ingested renderable data object; and remove the previously ingested renderable data object from the renderable object database.

In one example embodiment, a non-transitory computer-readable storage medium for ingesting a data object is provided. In some examples, the non-transitory computer-readable storage medium storing program code instructions that, when executed, cause a computing device to transmit a poll request to a flat file server requesting a flat file data object; receive the flat file data object, wherein the flat file data object contains at least one of strings, integers, Booleans, objects, arrays of objects, arrays of Booleans, arrays of strings, or arrays of integers; parse the flat file data object into a renderable data object comprising an array of parts according to defined properties for ingesting the flat file data object; determine compliance of the renderable data object by comparing each part of the array of parts with object constraints in the defined properties to identify one or more non-compliant parts of the renderable data object; determine a compliance alert that identifies the one or more non-compliant parts of the renderable data object; transmit the compliance alert to the flat file server; identify one or more candidate duplicate parts from the array of parts; compare the candidate duplicate parts from the array of parts with a part registry stored to a deduplication database to generate a duplication score for the renderable data object; and output the duplication score for the renderable data object; and store the renderable data object in a renderable object database.

In one example, the program code instructions, when executed, further cause the computing device to determine one or more compliance solutions for each of the one or more non-compliant parts, wherein the one or more compliance solutions comprise a change to the renderable data object or the flat file data object that will make the one or more non-compliant parts compliant; and wherein determining the compliance alert further comprises including the one or more compliance solutions for each of the one or more non-compliant parts in the compliance alert.

In one example, the program code instructions, when executed, further cause the computing device to determine a compliance action for each of the one or more compliance solutions, wherein the compliance action, when executed by the computing device changes the renderable data object such that the one or more non-compliant parts become compliant; and update the renderable data object according to the compliance action.

In one example, the program code instructions, when executed, further cause the computing device to determine from the duplication score a deduplication action; determine a deduplication recommendation, wherein the deduplication recommendation comprises a change to the flat file data object, at the flat file server, that will lower the duplication score; determine a duplicate alert that identifies the duplication score, deduplication action, and deduplication recommendation; and transmit the duplicate alert to the flat file server.

In one example, the deduplication action comprises one of update the renderable data object with an indication as an alternate renderable data object; or update the renderable data object with an indication as a rejected renderable data object; and wherein the program code instructions, when executed, further cause the computing device to update the renderable data object according to the deduplication action.

In one example, the program code instructions, when executed, further cause the computing device to store the renderable data object and the duplication score for the renderable data object in the renderable object database.

In one example, the renderable object database comprises an external renderable object database.

In one example, the program code instructions, when executed, further cause the computing device to receive an updated flat file data object from the flat file server; and update a previously ingested renderable data object according to the updated flat file data object.

In one example, the program code instructions, when executed, further cause the computing device to receive, from the flat file server, a removal signal identifying a previously ingested renderable data object; and remove the previously ingested renderable data object from the renderable object database.

In one example, verification, validation, and updating (VVU) system for updating a data item database is provided. In some examples, the VVU system comprises a user interface, a rendering module, and a verification module, wherein the rendering module comprises a rendering processor and a rendering memory including rendering computer program code, the rendering memory and the rendering computer program code configured to, with the rendering processor, cause the rendering module to receive a select input from the user interface, wherein the select input is triggered by a user selection of a renderable data object via the user interface; determine that the renderable data object associated with the select input is externally sourced; upon determining that the renderable data object is externally sourced, transmit a check availability signal, receive an availability status signal in response to the check availability signal, and output an availability status to the user interface; receive a confirm selection input from the user interface, wherein the confirm selection input is triggered by a further user selection of the renderable data object; transmit a reserved status signal in response to the receiving the confirm selection input; receive a payment indication signal; and transmit a fulfill status signal in response to receiving the payment indication signal; and wherein the verification module comprises a verification processor and a verification memory including verification computer program code, the verification memory and the verification computer program code configured to, with the verification processor, cause the verification module to receive the check availability signal from the rendering module; determine availability data based on the check availability signal; transmit the availability status signal to the rendering module based on the availability data; receive the reserved status signal from the rendering module; update the data item database to indicate a reserved status for a data item associated with the renderable data object upon receiving the reserved status signal; receive the fulfill status signal from the rendering module; and transmit a fulfill order signal in response to receiving the fulfill status signal.

In one example, the rendering module is further configured to: add security encryption to the check availability signal, to the reserved status signal, and to the fulfill status signal; and parse security encryption of the availability status signal and of the payment indication signal.

In one example, the verification module is further configured to parse security encryption of the check availability signal, of the reserved status signal, and of the fulfill status signal; and add security encryption to the availability status signal and to the payment indication signal.

In one example, the rendering module is further configured to receive a cancel user input, wherein the cancel user input includes a cancel selection of the renderable data object; transmit a cancel signal including an identified data item represented by the selected renderable data object to be cancelled; and receive a cancelling status signal; determine a cancellation status of the user cancel selected renderable data object from the cancelling status signal; and wherein the verification module is further configured to receive the cancel signal; determine the cancellation status of the identified data item in the data item mark the identified data item in the data item database as cancelling; and transmit the cancelling status signal, including the cancellation status of the data item.

In one example, the rendering module is further configured to receive a retrieve user input, wherein the retrieve user input includes a retrieve selection of the renderable data object; transmit a retrieve status signal including the identified data item represented by the selected renderable data object to determine a current status; and receive a current status signal; determine the current status of the user selected renderable data object from the current status signal; and wherein the verification module is further configured to receive the retrieve status signal; determine the current status of the identified data item in the data item; and transmit the current status signal, including the current status of the identified data item.

In one example, the check availability signal includes an encrypted user identification, and wherein the verification module is further configured to determine that the verification module can identify a user from the encrypted user identification contained in the check availability signal; determine a user specific availability from the data item database; transmit the availability status signal to the rendering module based on the user specific availability; receive a hash reserve signal including a hash user input and the encrypted user identification; transmit the reserved signal indicating the flagged item as reserved using the encrypted user identification.

In one example, the check availability signal includes an encrypted user identification, and wherein the verification module is further configured to determine that the verification module cannot identify a user from the encrypted user identification contained in the check availability signal; determine a global availability from the data item database; transmit the availability status signal to the rendering module based on the global specific availability; receive a hash reserve signal including a hash user input and the encrypted user identification; receive new user identification from the user; store the new user identification; encrypt the stored new user identification; and transmit the reserved signal indicating the flagged item as reserved using the stored new user identification.

In one example, the rendering module is further configured to transmit an integration request in response to the user selection of an integration selection; receive a user interface nesting element integrate the user interface nesting element into the user interface and present at least one or more selectable items to a user; and receive a nested user selection of one or more of the one or more selectable items; and transmit a user selection signal indicating the nested user selection; and wherein the verification module is further configured to receive the integration request; transmit, in response to the integration request, the user interface nesting element comprising the one or more selectable items; receive the user selection signal; and determine the data item to reserve from the nested user selection signal.

In one example, the verification module is further configured to determine that the data item associated with the renderable data object includes one or more input fields; derive the one or more input fields from the data item database; transmit the one or more input fields as a component of the availability status signal; receive an input fields user input signal; and store one or more input field responses in the data item database; and wherein the rendering module is further configured to: receive the one or more input fields with the availability status signal; render the one or more input fields as part of the user interface; receiving a further user input wherein the further user input includes user input information in the rendered one or more input fields and an input field user selection of the renderable data object; and transmit the user input information in the rendered input fields as the input fields user input signal.

In one example, the one or more inputs fields when rendered as part of the user interface comprises one or more of a text input field; a selectable input field; a drop down menu field; or a radio button field.

In one example, the one or more input field responses comprises one or more of a group selection; Booleans; an email; a phone number; a textual input; or a numerical input.

In one example, a method for updating a data item database is provided. The method includes receiving, by a rendering module, a select input from a user interface, wherein the select input is triggered by a user selection of a renderable data object via the user interface; determining, by the rendering module, that the renderable data object associated with the select input is externally sourced; upon determining that the renderable data object is externally sourced, transmitting, by the rendering module, a check availability signal, receiving, by a verification module, the check availability signal from the rendering module; determining, by the verification module, availability data based on the check availability signal; transmitting, by the verification module, an availability status signal to the rendering module based on the availability data; receiving, by the rendering module, the availability status signal in response to the check availability signal, outputting, by the rendering module, an availability status to the user interface; receiving, by the rendering module, a confirm selection input from the user interface, wherein the confirm selection input is triggered by a further user selection of the renderable data object; transmitting, by the rendering module, a reserved status signal in response to the receiving the confirm selection input; receiving, by the verification module, the reserved status signal from the rendering module; updating, by the verification module, the data item database to indicate a reserved status for a data item associated with the renderable data object upon receiving the reserved status signal; receiving, by the rendering module, a payment indication signal; transmitting, by the rendering module, a fulfill status signal in response to receiving the payment indication signal; receiving, by the verification module, the fulfill status signal from the rendering module; and transmitting, by the verification module, a fulfill order signal in response to receiving the fulfill status signal.

In one example, the method further includes adding security encryption, by the rendering module, to the check availability signal, to the reserved status signal, and to the fulfill status signal; and parsing security encryption, by the rendering module, of the availability status signal and of the payment indication signal.

In one example, the method further includes parsing security encryption, by the verification module, of the check availability signal, of the reserved status signal, and of the fulfill status signal; and adding security encryption, by the verification module, to the availability status signal and to the payment indication signal.

In one example, the method further includes receiving, by the rendering module, a cancel user input, wherein the cancel user input includes a cancel selection of the renderable data object; transmitting, by the rendering module, a cancel signal including an identified data item represented by the selected renderable data object to be cancelled; and receiving, by the verification module, the cancel signal; determining, by the verification module, a cancellation status of the identified data item in the data item; marking, by the verification module, the identified data item in the data item database as cancelling; transmitting, by the verification module, a cancelling status signal, including the cancellation status of the data item; receive, by the rendering module, the cancelling status signal; and determining, by the rendering module, the cancellation status of the user cancel selected renderable data object from the cancelling status signal.

In one example, the method further includes receiving, by the rendering module, a retrieve user input, wherein the retrieve user input includes a retrieve selection of the renderable data object; transmitting, by the rendering module, a retrieve status signal including the identified data item represented by the selected renderable data object to determine a current status; receiving, by the verification module, the retrieve status signal; determining, by the verification module, the current status of the identified data item in the data item; transmitting, by the verification module, a current status signal, including the current status of the identified data item; receiving, by the rendering module, the current status signal; and determining, by the rendering module, the current status of the user selected renderable data object from the current status signal.

In one example, the method further includes determining, by the verification module, that the verification module can identify a user from encrypted user identification contained in the check availability signal; determining, by the verification module, a user specific availability from the data item database; transmitting, by the verification module, the availability status signal to the rendering module based on the user specific availability; receiving, by the verification module, a hash reserve signal including a hash user input and the encrypted user identification; and transmitting, by the verification module, the reserved signal indicating the flagged item as reserved using the encrypted user identification.

In one example, the method further includes determining, by the verification module, that the verification module cannot identify a user from encrypted user identification contained in the check availability signal; determining, by the verification module, a global availability from the data item database; transmitting, by the verification module, the availability status signal to the rendering module based on the global specific availability; receiving, by the verification module, a hash reserve signal including a hash user input and the encrypted user identification; receiving, by the verification module, new user identification from the user; storing, by the verification module, the new user identification; encrypting, by the verification module, the stored new user identification; and transmitting, by the verification module, the reserved signal indicating the flagged item as reserved using the stored new user identification.

In one example, the method further includes transmitting, by the rendering module, an integration request in response to a user selection of an integration selection; receiving, by the verification module, the integration request; transmitting, by the verification module and in response to the integration request, a user interface nesting element comprising at least one or more selectable items; receiving, by the rendering module, the user interface nesting element; integrating, by the rendering module, the user interface nesting element into the user interface and present at least the one or more selectable items; receiving, by the rendering module, a nested user selection of one or more of the one or more selectable items; transmitting, by the rendering module, a user selection signal indicating the nested user selection; receiving, by the verification module, the user selection signal; and determining, by the verification module, the data item to reserve from the nested user selection signal.

In one example, the method further includes determining, by the verification module, that the data item associated with the renderable data object includes one or more input fields; deriving, by the verification module, the one or more input fields from the data item database; transmitting, by the verification module, the one or more input fields as a component of the availability status signal; receiving, by the rendering module, the one or more input fields with the availability status signal; rendering, by the rendering module, the one or more input fields as part of the user interface; receiving, by the rendering module, a further user input wherein the further user input includes user input information in the rendered one or more input fields and an input field user selection of the renderable data object; transmitting, by the rendering module, the user input information in the rendered input fields as an input fields user input signal; receiving, by the verification module, the input fields user input signal; and storing, by the verification module, one or more input field responses in the data item database.

In one example, the one or more inputs fields when rendered as part of the user interface comprises one or more of a text input field; a selectable input field; a drop down menu field; or a radio button field.

In one example, the one or more input field responses comprises one or more of a group selection; Booleans; an email; a phone number; a textual input; or a numerical input.

In one example, an apparatus for updating a data item database is provided. The apparatus comprising a plurality of data items, the apparatus comprising at least one processor and at least one memory including computer program code, the at least one memory and the computer program code configured to, with the at least one processor, cause the apparatus to receive a select input from a user interface, wherein the select input is triggered by a user selection of a renderable data object via the user interface; determine that the renderable data object associated with the select input is externally sourced; upon determining that the renderable data object is externally sourced, transmit a check availability signal; receive an availability status signal in response to the check availability signal; output an availability status to the user interface; receive a confirm selection input from the user interface, wherein the confirm selection input is triggered by a further user selection of the renderable data object; transmit a reserved status signal in response to the receiving the confirm selection input; receive a payment indication signal; and transmit a fulfill status signal in response to receiving the payment indication signal.

In one example, the at least one memory and the computer program code are further configured to, with the at least one processor, cause the apparatus to further add security encryption to the check availability signal, to the reserved status signal, and to the fulfill status signal; and parse security encryption of the availability status signal and of the payment indication signal.

In one example, the at least one memory and the computer program code are further configured to, with the at least one processor, cause the apparatus to further receive a cancel user input, wherein the cancel user input includes a cancel selection of the renderable data object; transmit a cancel signal including an identified data item represented by the selected renderable data object to be cancelled; and determine a cancellation status of the user cancel selected renderable data object from a cancelling status signal.

In one example, the at least one memory and the computer program code are further configured to, with the at least one processor, cause the apparatus to further: receive a retrieve user input, wherein the retrieve user input includes a retrieve selection of the renderable data object; transmit a retrieve status signal including the identified data item represented by the selected renderable data object to determine a current status; receive a current status signal; and determine the current status of the user selected renderable data object from the current status signal.

In one example, the at least one memory and the computer program code are further configured to, with the at least one processor, cause the apparatus to further transmit an integration request in response to a user selection of an integration selection; receive a user interface nesting element comprising least one or more selectable items; integrate the user interface nesting element into the user interface and present at least the one or more selectable items; receive a nested user selection of one or more of the one or more selectable items; and transmit a user selection signal indicating the nested user selection.

In one example, the at least one memory and the computer program code are further configured to, with the at least one processor, cause the apparatus to further receive one or more input fields with the availability status signal; render the one or more input fields as part of the user interface; receive a further user input wherein the further user input includes user input information in the rendered one or more input fields and an input field user selection of the renderable data object; and transmit the user input information in the rendered input fields as an input fields user input signal.

In one example, the one or more inputs fields when rendered as part of the user interface comprises one or more of a text input field; a selectable input field; a drop down menu field; or a radio button field.

In one example, the further user input comprises one or more of a group selection; Booleans; an email; phone number; a textual input; or a numerical input.

In one example, a non-transitory computer-readable storage medium for updating a data item database is provided. In some examples, the non-transitory computer-readable storage medium storing program code instructions that, when executed, cause a computing device to receive a select input from a user interface, wherein the select input is triggered by a user selection of a renderable data object via the user interface; determine that the renderable data object associated with the select input is externally sourced; upon determining that the renderable data object is externally sourced, transmit a check availability signal, receive an availability status signal in response to the check availability signal, output an availability status to the user interface; receive a confirm selection input from the user interface, wherein the confirm selection input is triggered by a further user selection of the renderable data object; transmit a reserved status signal in response to the receiving the confirm selection input; receive a payment indication signal; and transmit a fulfill status signal in response to receiving the payment indication signal.

In one example, the program code instructions, when executed, further cause the computing device to add security encryption to the check availability signal, to the reserved status signal, and to the fulfill status signal; and parse security encryption of the availability status signal and of the payment indication signal.

In one example, the program code instructions, when executed, further cause the computing device to receive a cancel user input, wherein the cancel user input includes a cancel selection of the renderable data object; transmit a cancel signal including an identified data item represented by the selected renderable data object to be cancelled; and determine a cancellation status of the user cancel selected renderable data object from the cancelling status signal.

In one example, the program code instructions, when executed, further cause the computing device to receive a retrieve user input, wherein the retrieve user input includes a retrieve selection of the renderable data object; transmit a retrieve status signal including the identified data item represented by the selected renderable data object to determine a current status; receive a current status signal; and determine the current status of the user selected renderable data object from the current status signal.

In one example, the program code instructions, when executed, further cause the computing device to transmit an integration request in response to a user selection of an integration selection; receive a user interface nesting element; integrate the user interface nesting element into the user interface and present at least the one or more selectable items; receive a nested user selection of one or more of the one or more selectable items; and transmit a user selection signal indicating the nested user selection.

In one example, the program code instructions, when executed, further cause the computing device to receive one or more input fields with the availability status signal; render the one or more input fields as part of the user interface; receive a further user input wherein the further user input includes user input information in the rendered one or more input fields and an input field user selection of the renderable data object; and transmit the user input information in the rendered input fields as an input fields user input signal.

In one example, the one or more inputs fields when rendered as part of the user interface comprises one or more of a text input field; a selectable input field; a drop down menu field; or a radio button field. In one example, the further user input comprises one or more of a group selection; Booleans; an email; a phone number; a textual input; or a numerical input.

BRIEF DESCRIPTION OF THE DRAWINGS

Figure 1A:
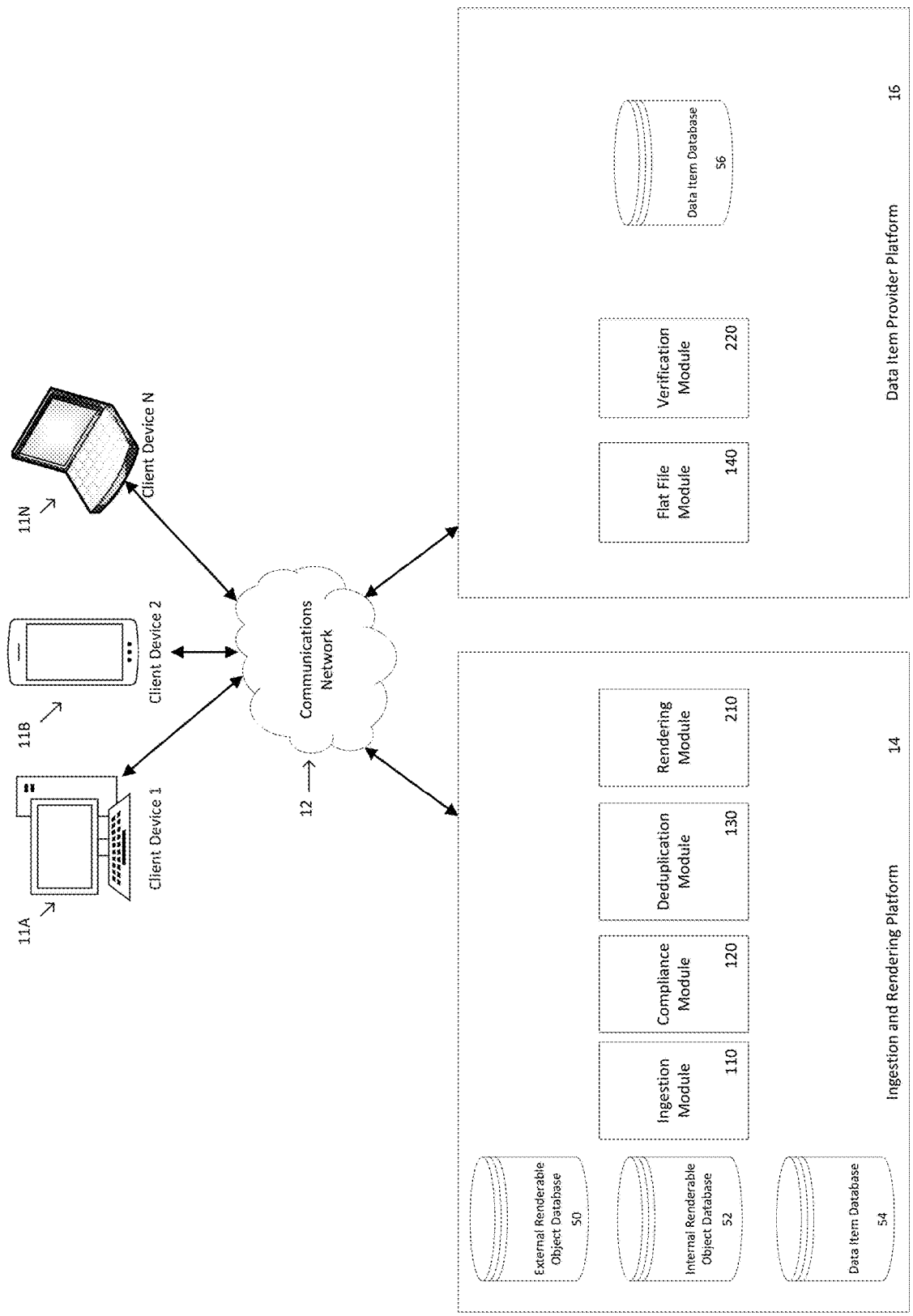
Figure 1B:
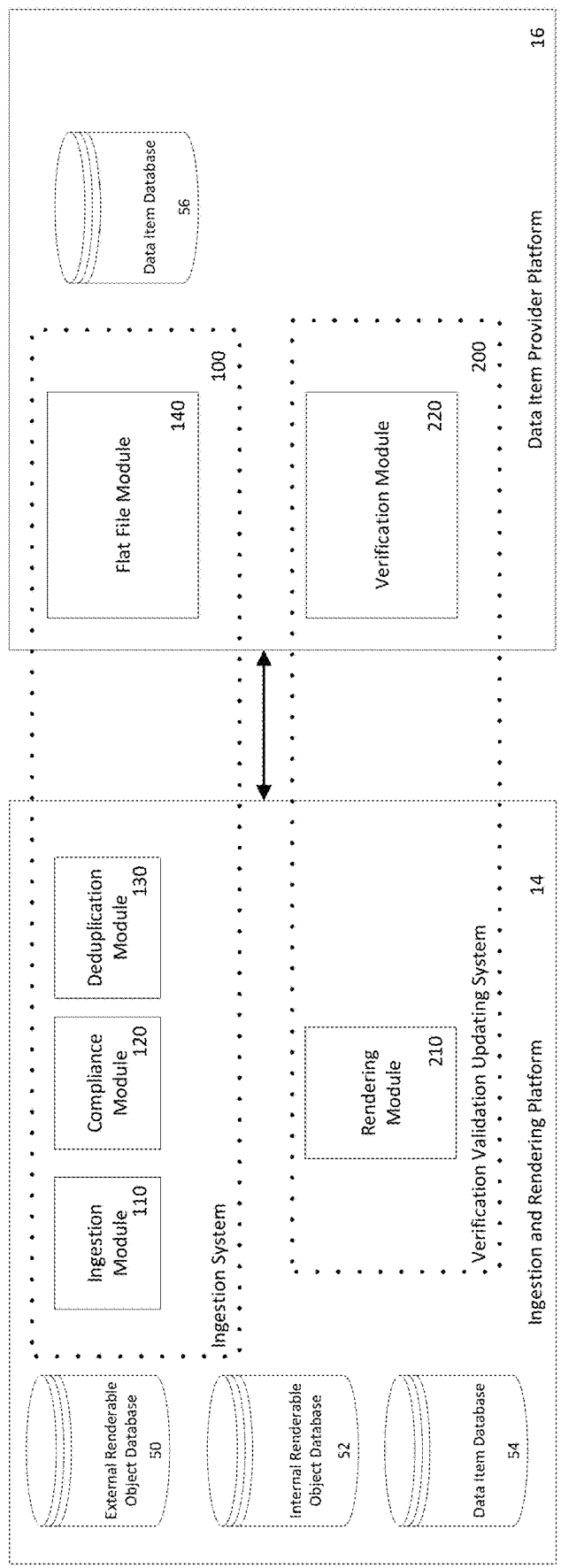
Figure 2A:
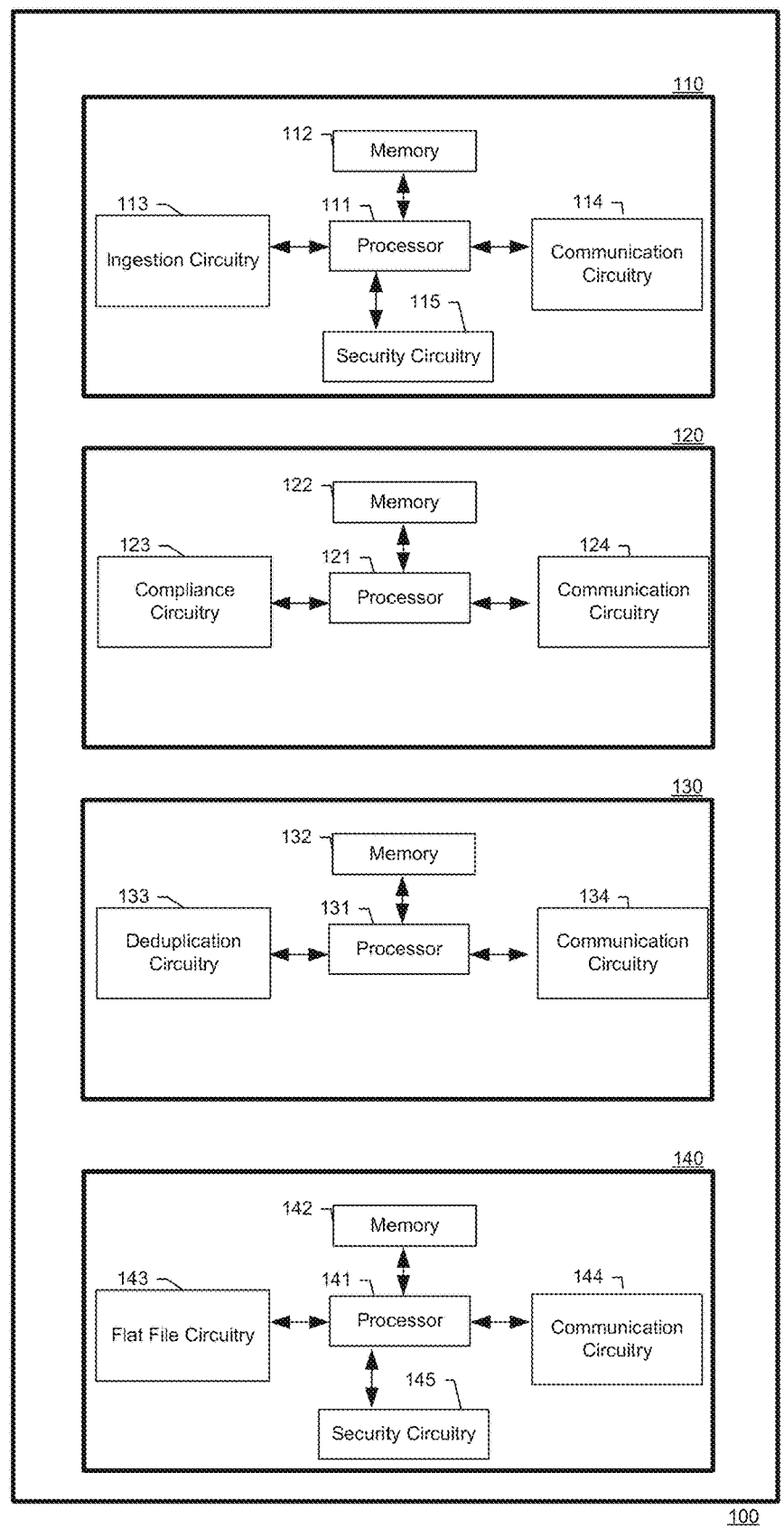
Figure 2B:
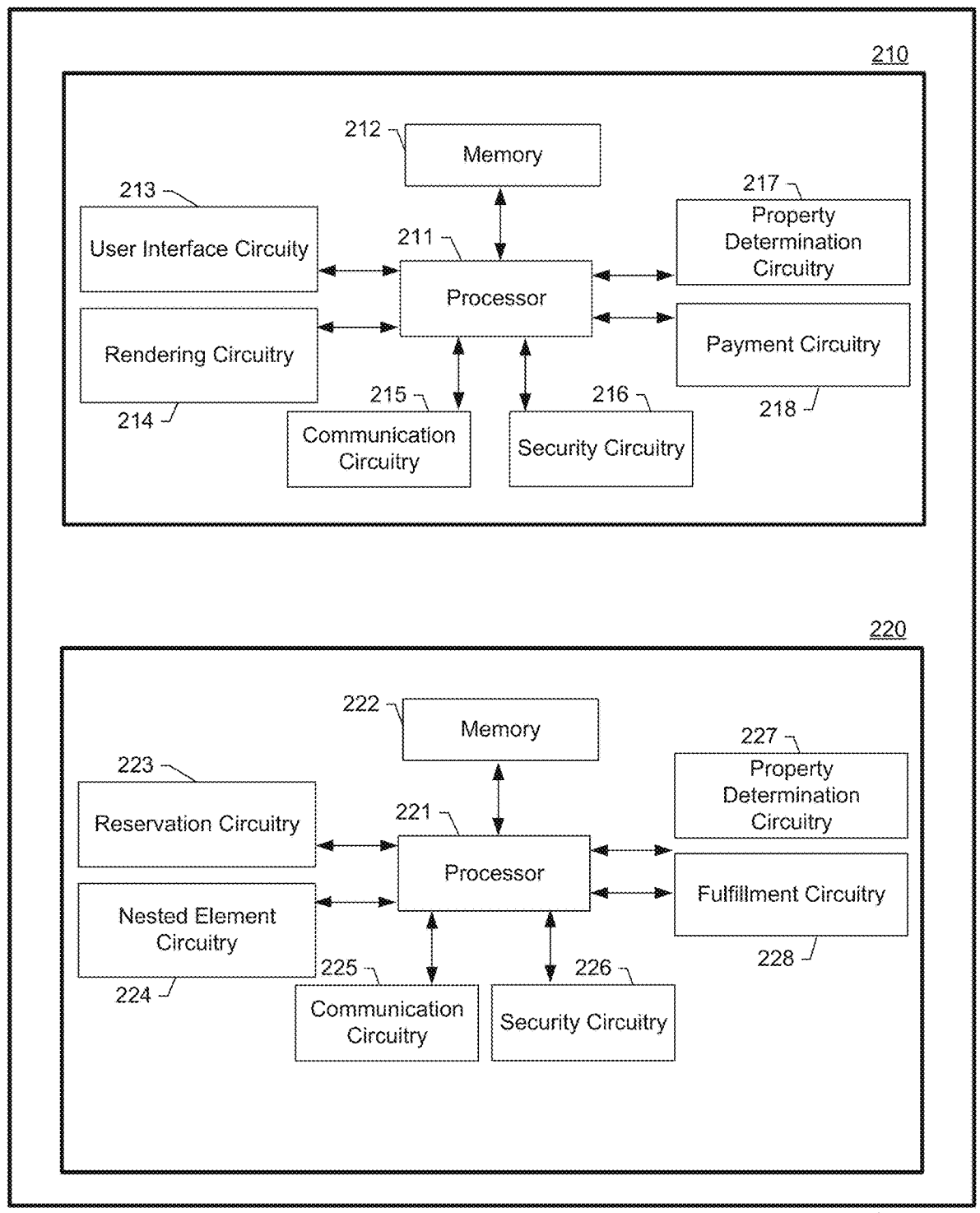
Figure 3:
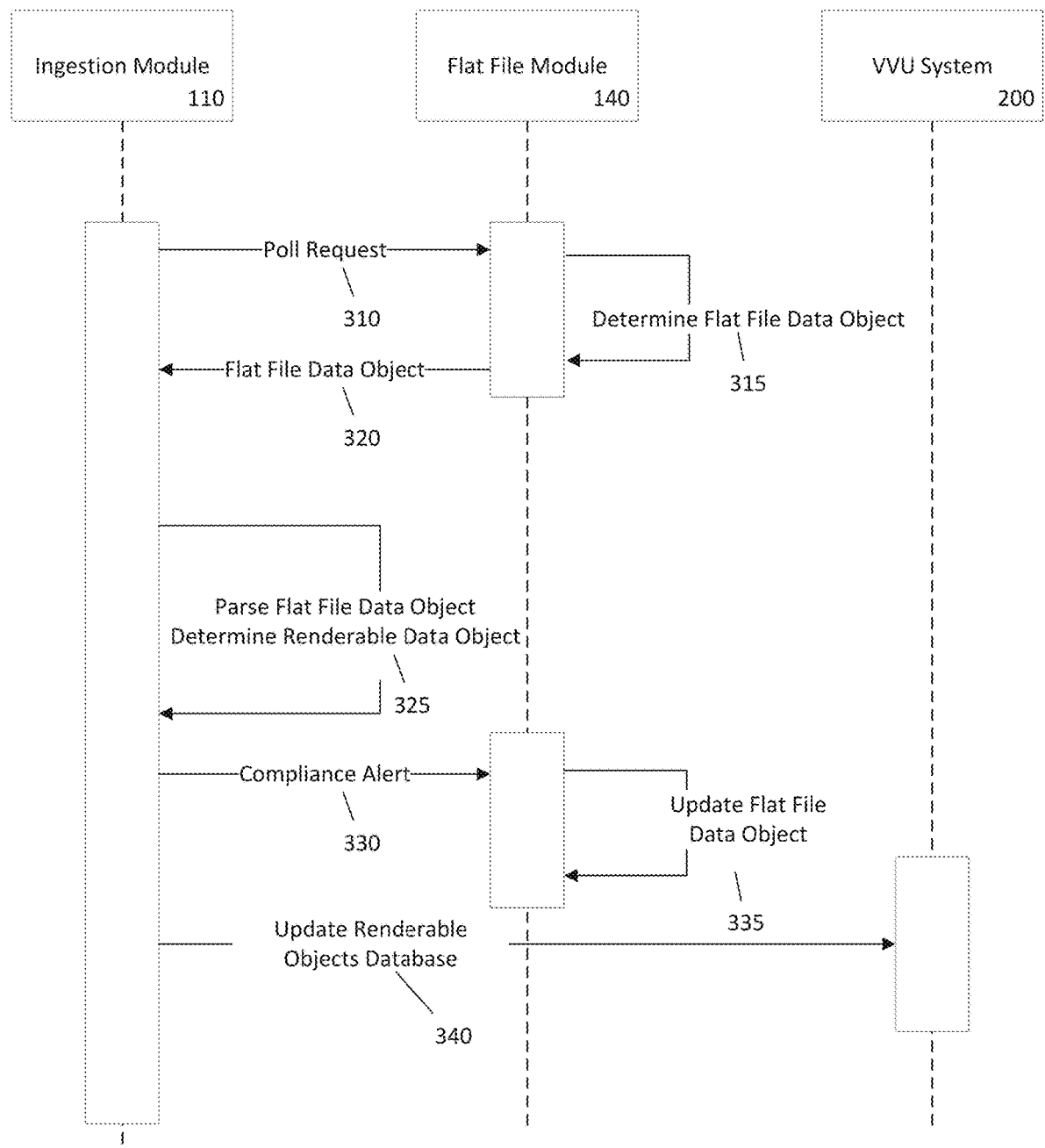
Figure 4A:
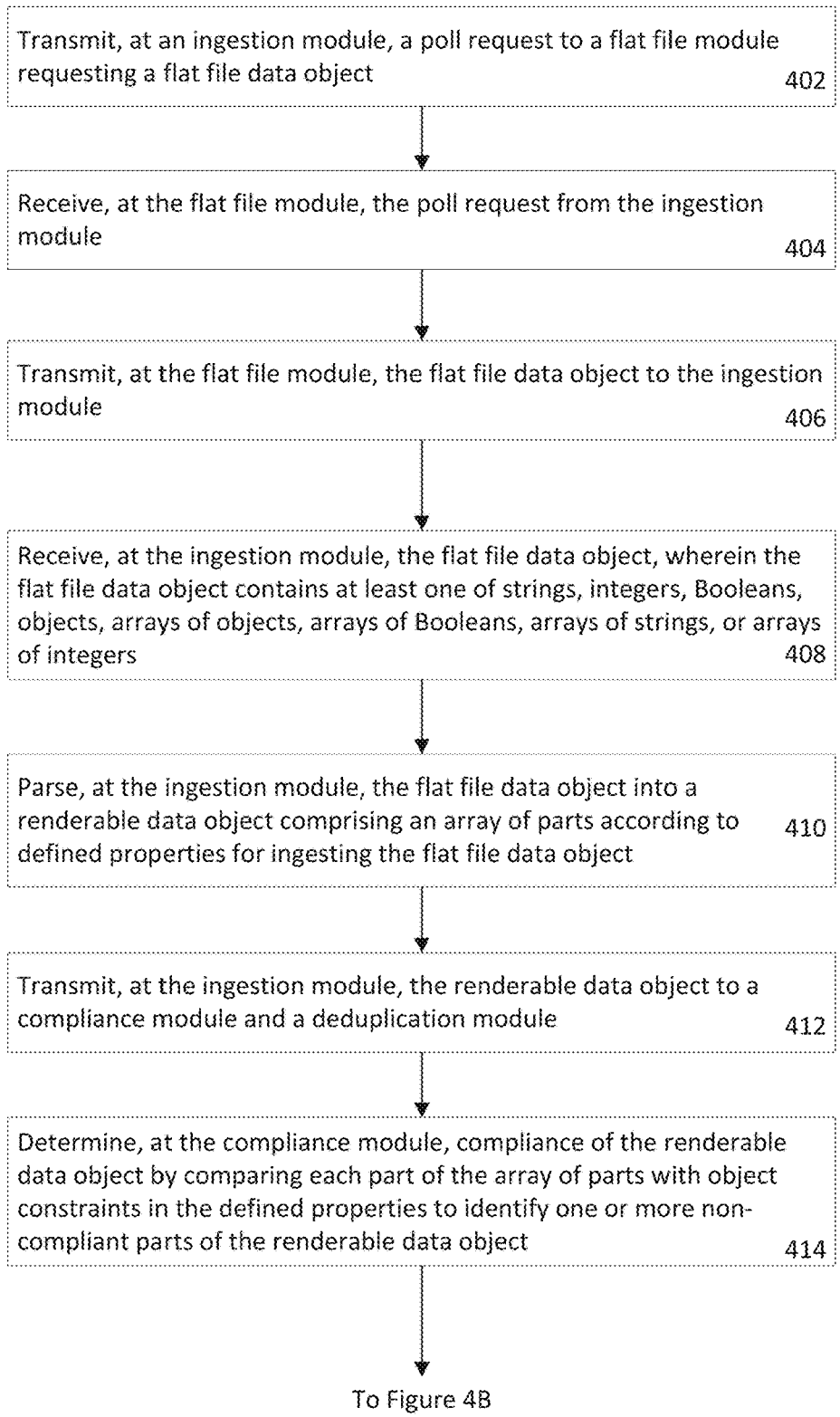
Figure 4B:
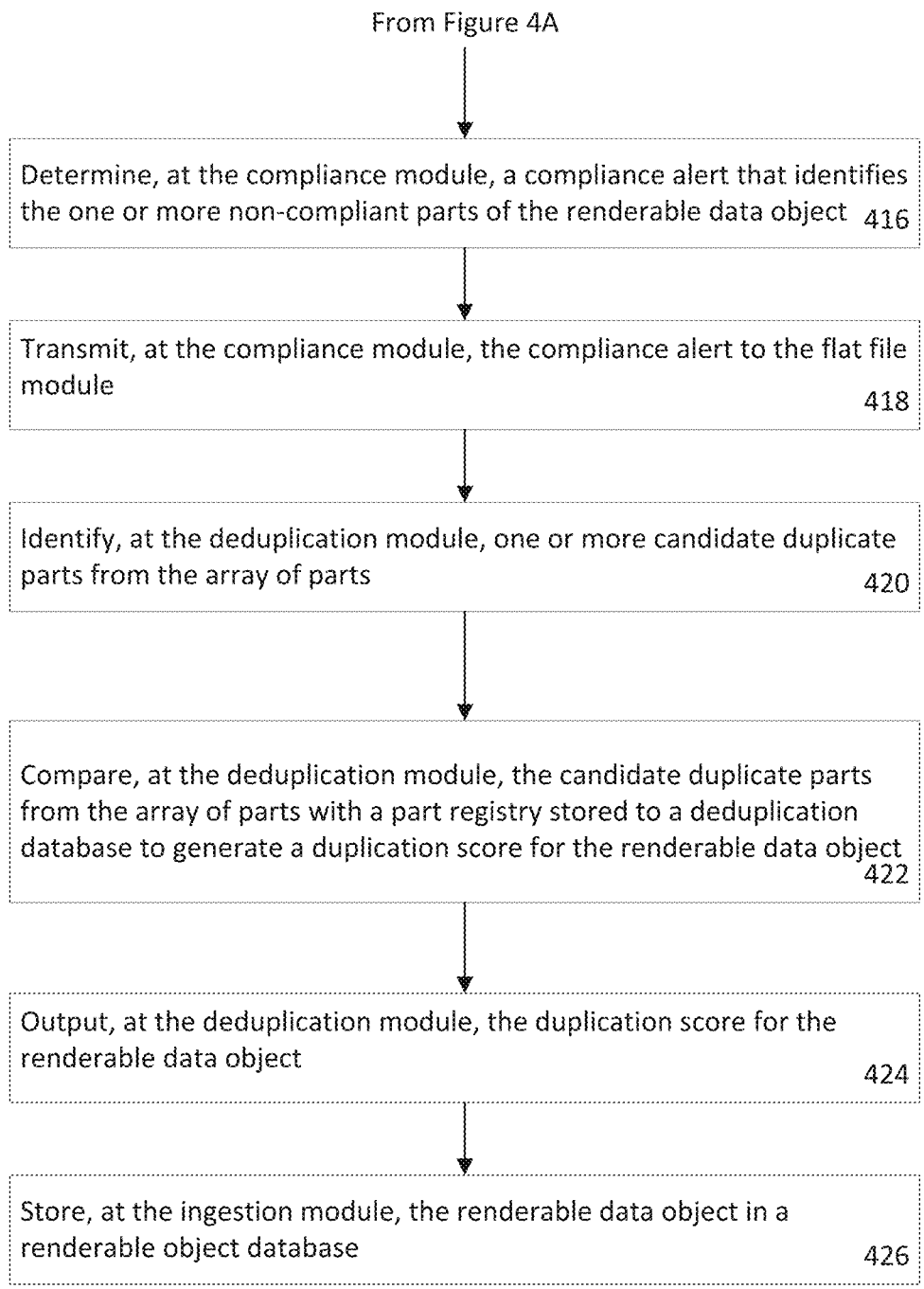
Figure 5A:
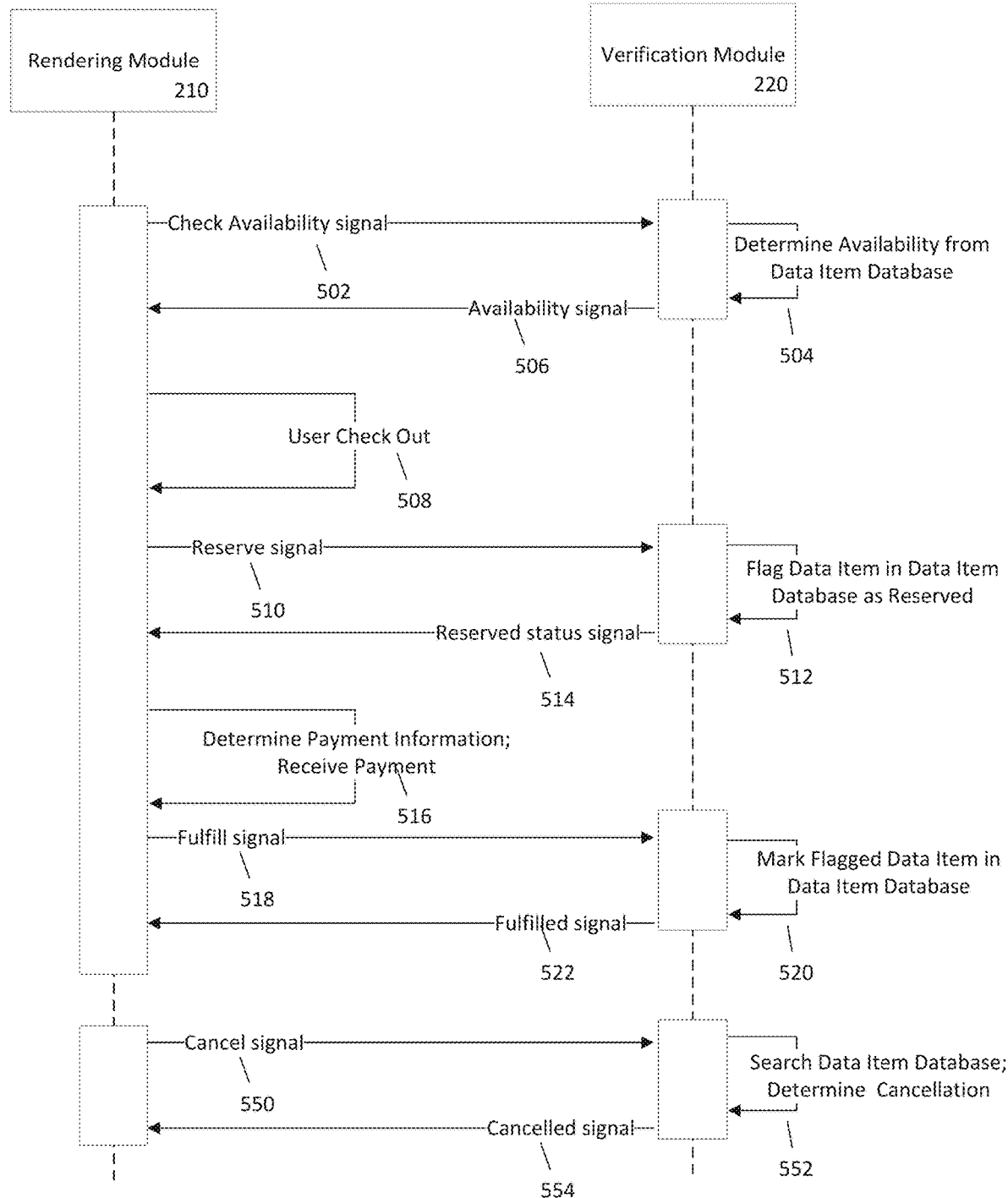
Figure 5B:
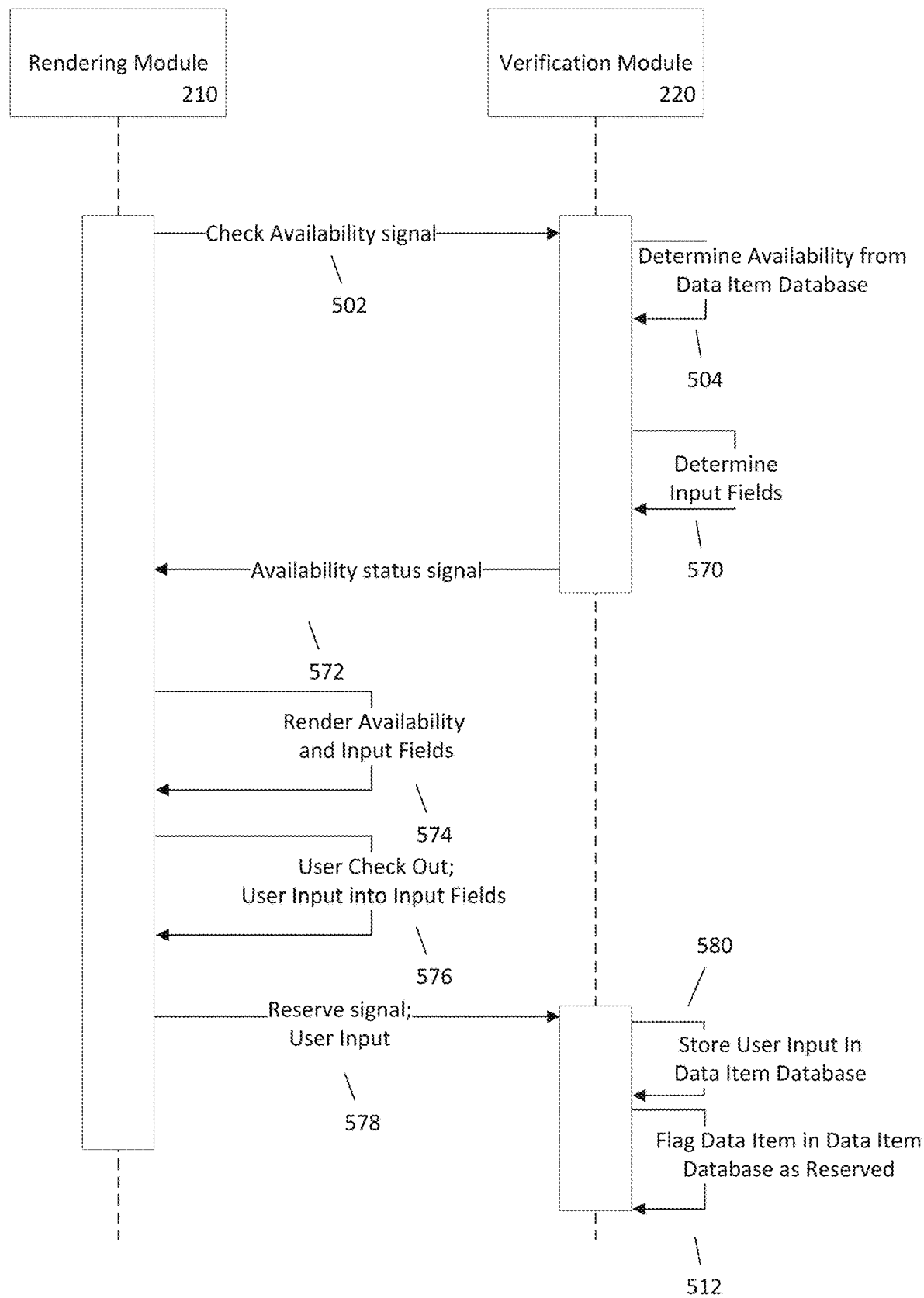
Figure 6:
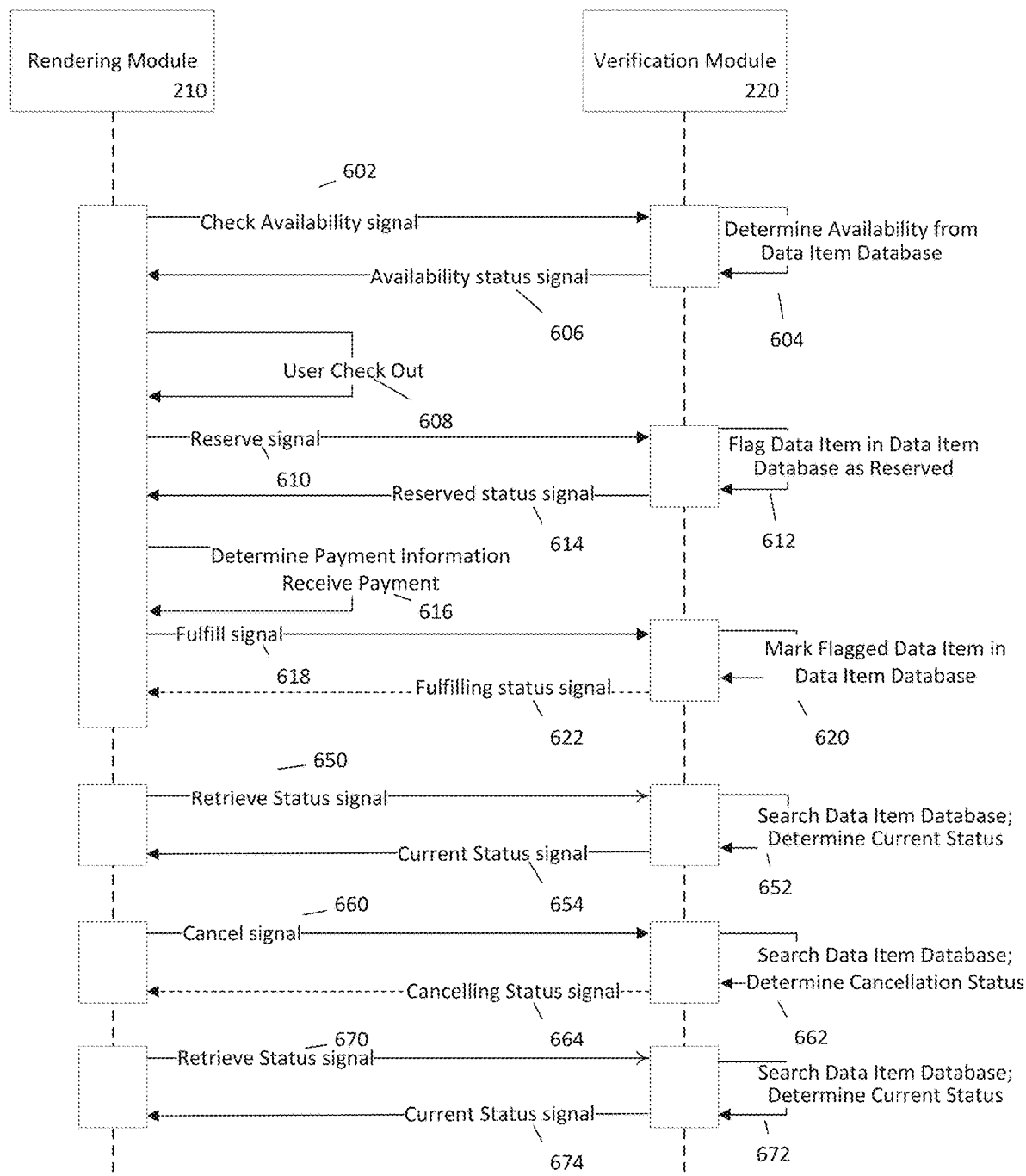
Figure 7:
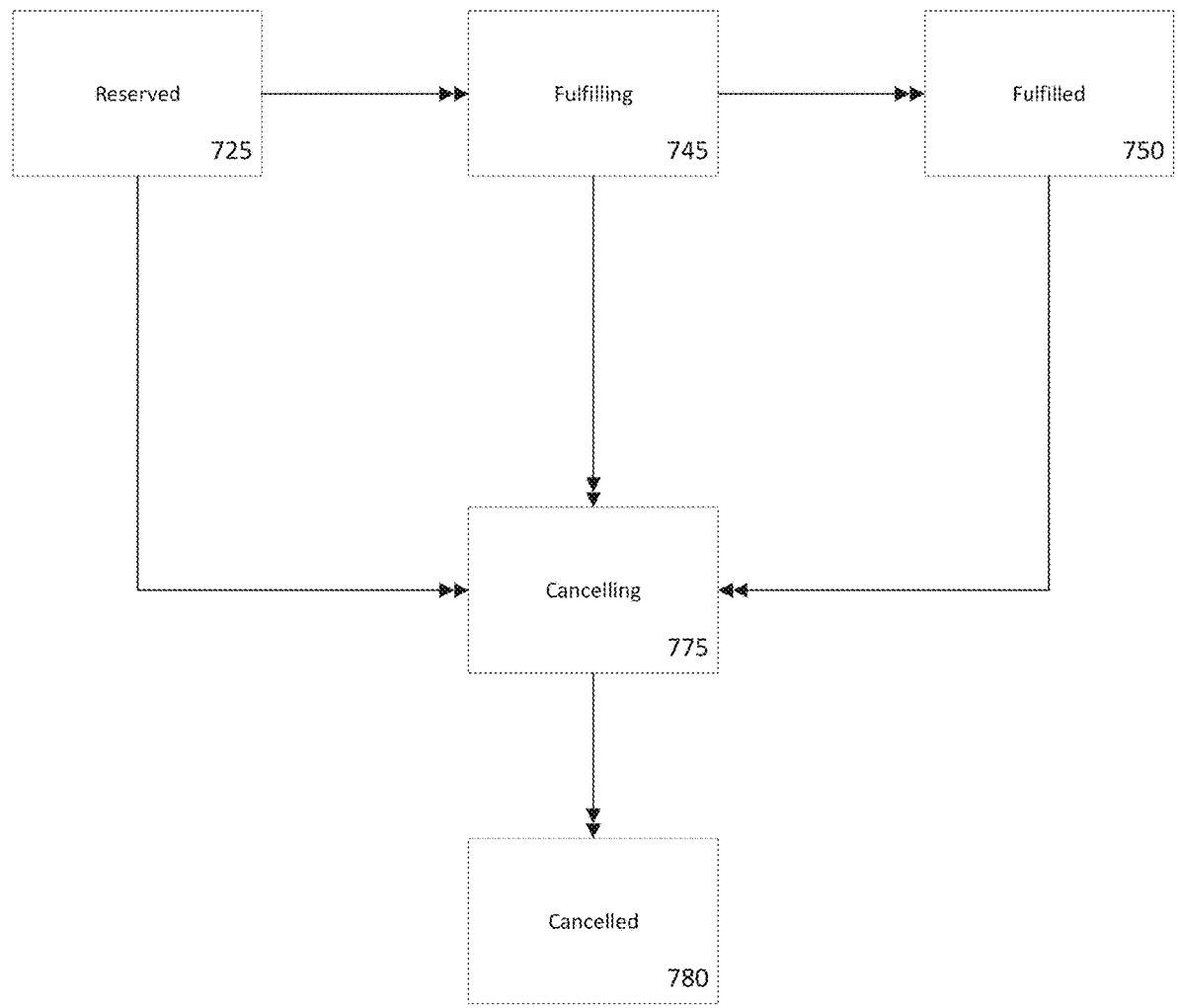
Figure 8A:
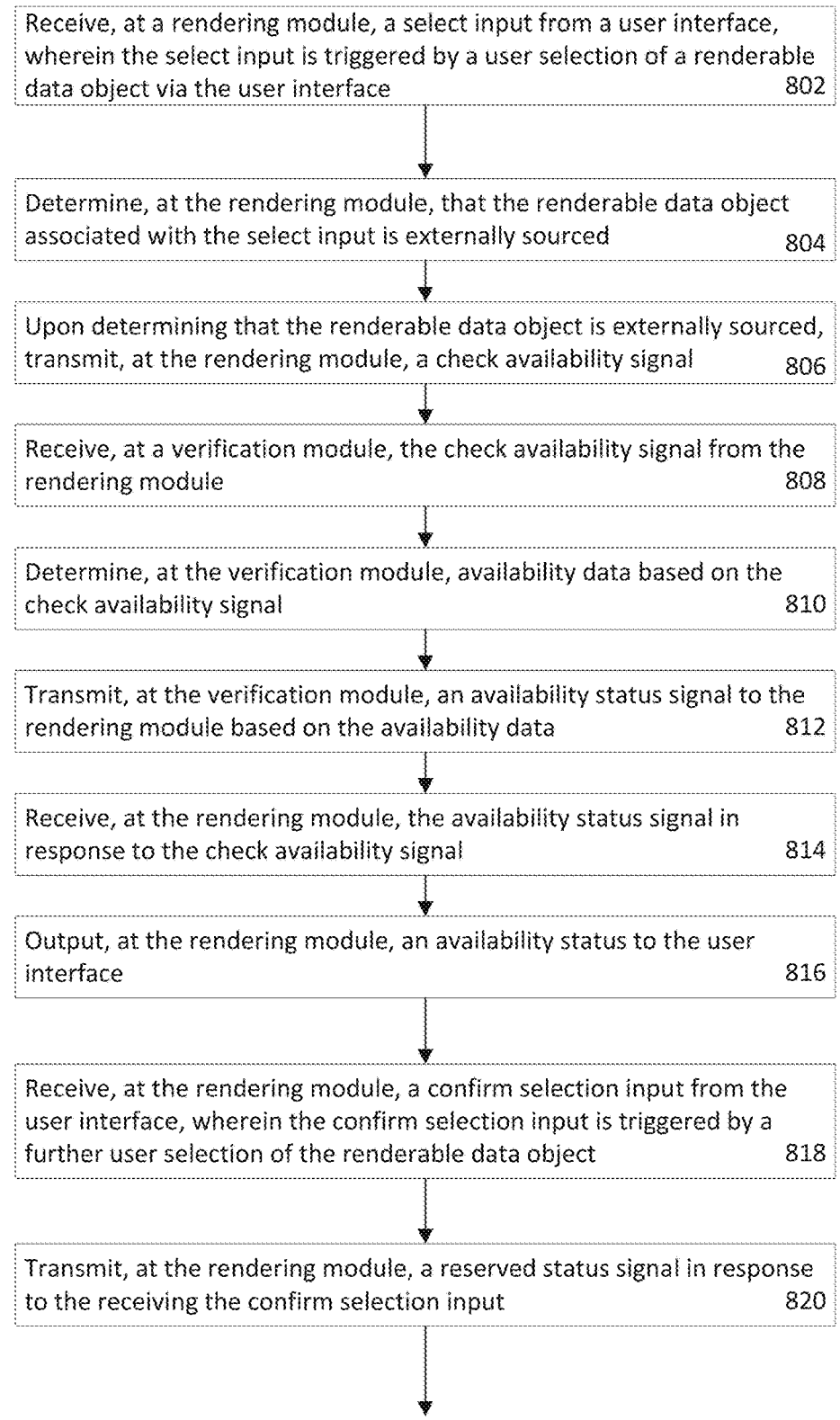
Figure 8B:
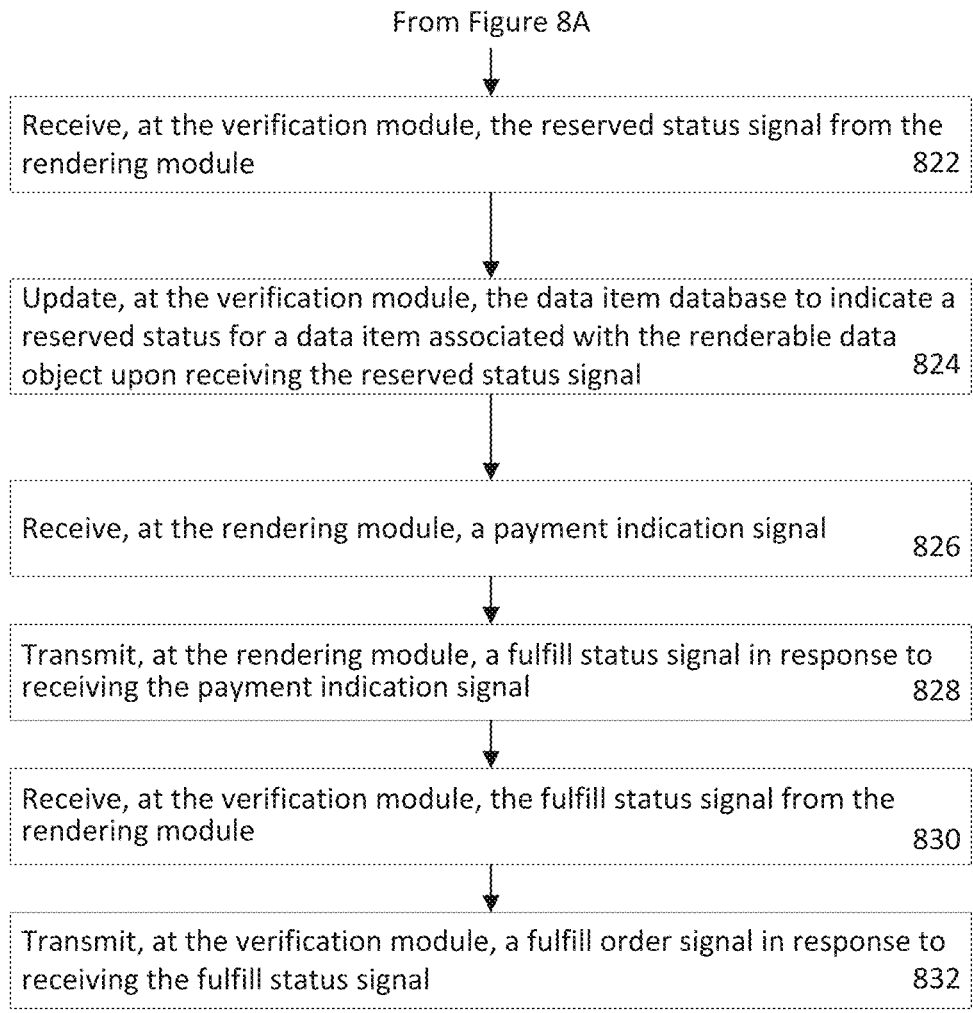
Figure 9:
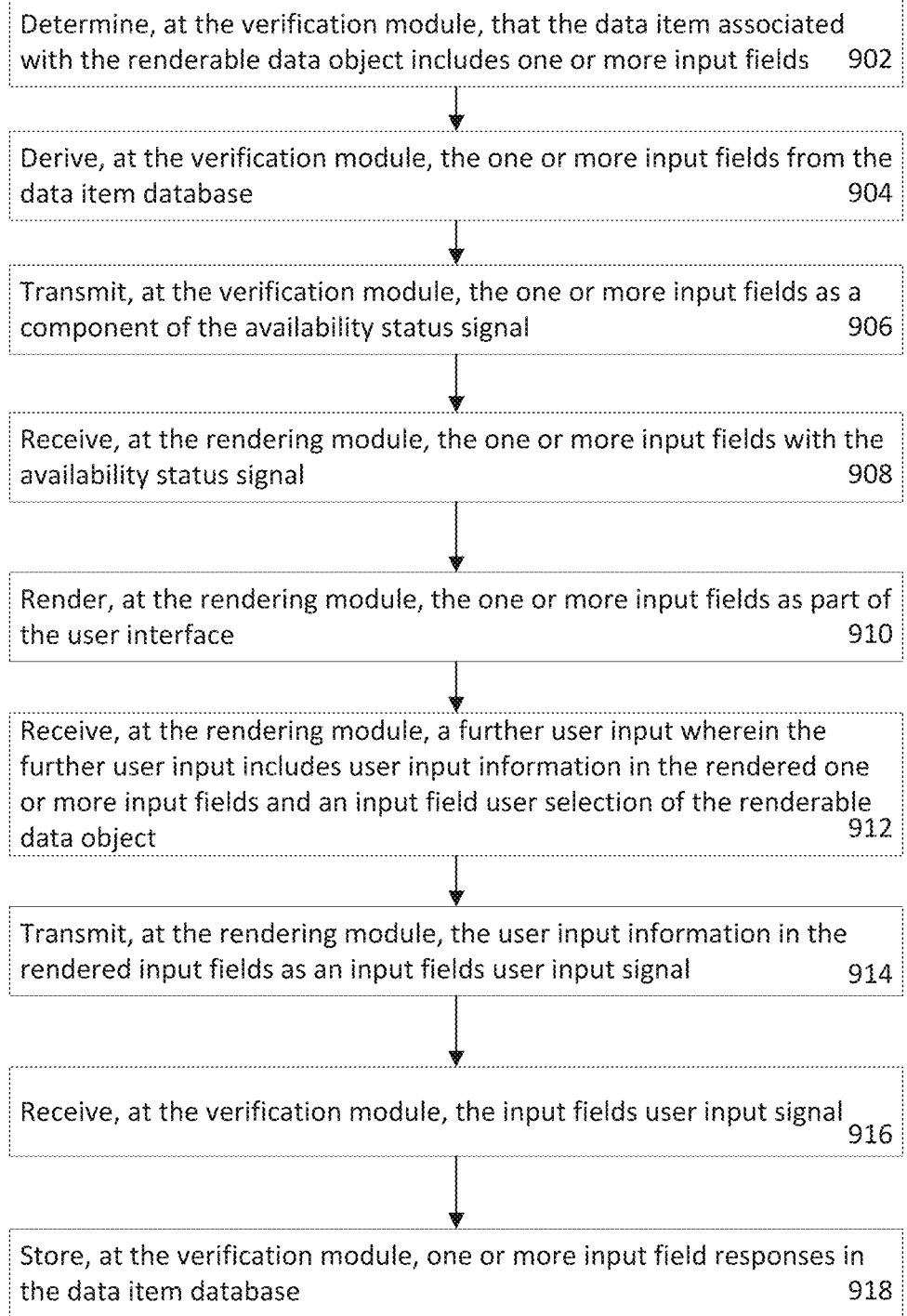
Figure 10A:
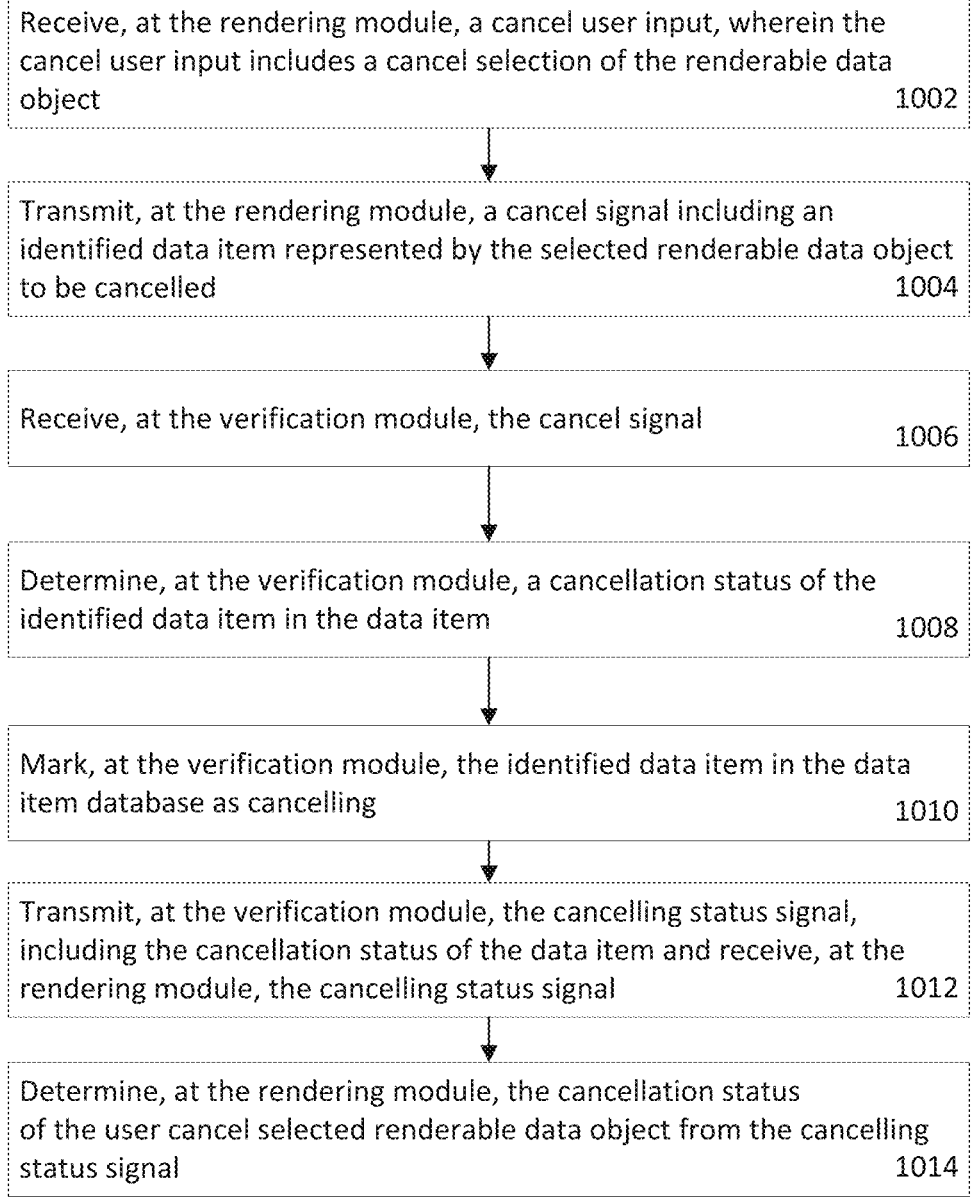
Figure 10B:
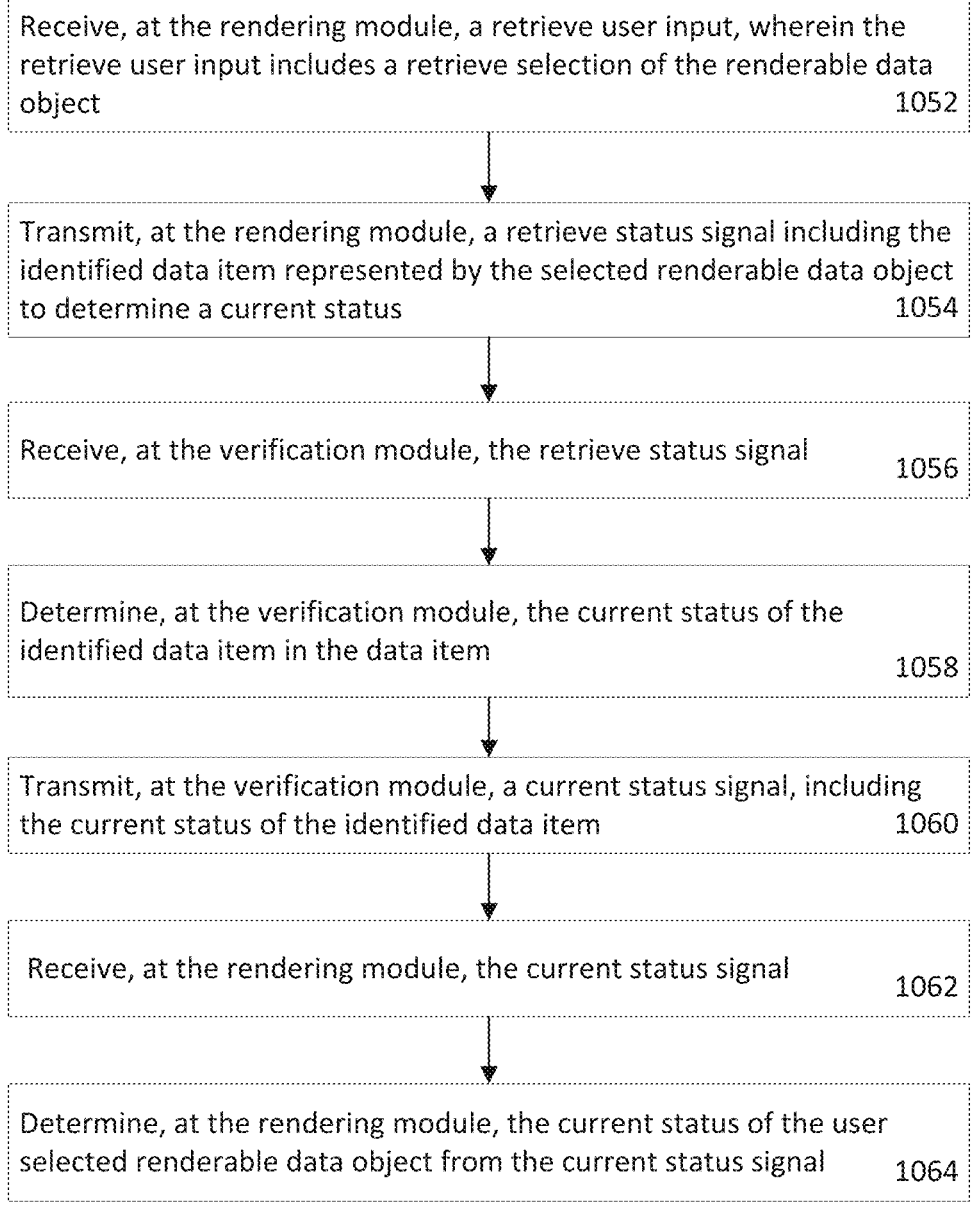
Figure 11:
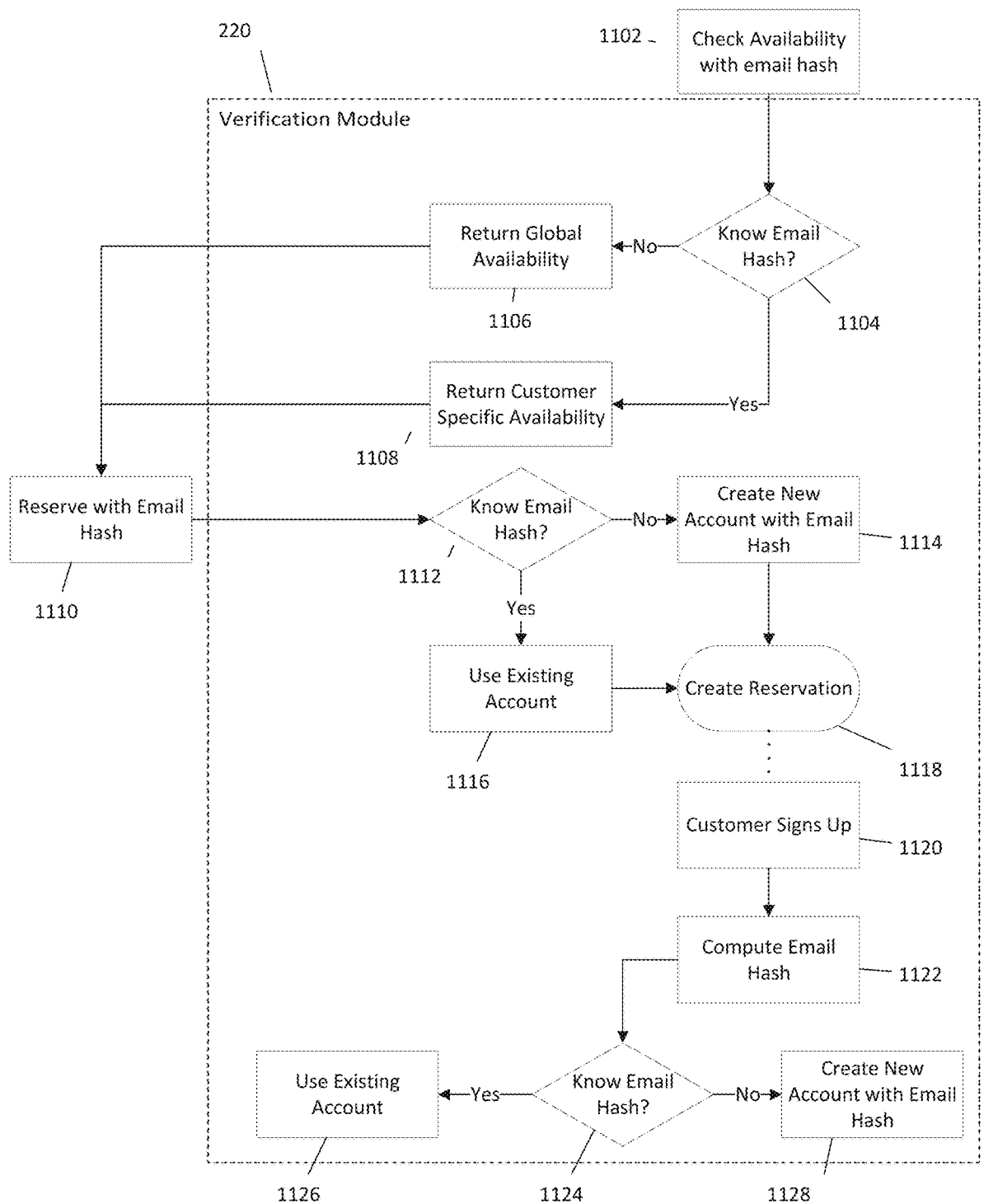
Figure 12A:
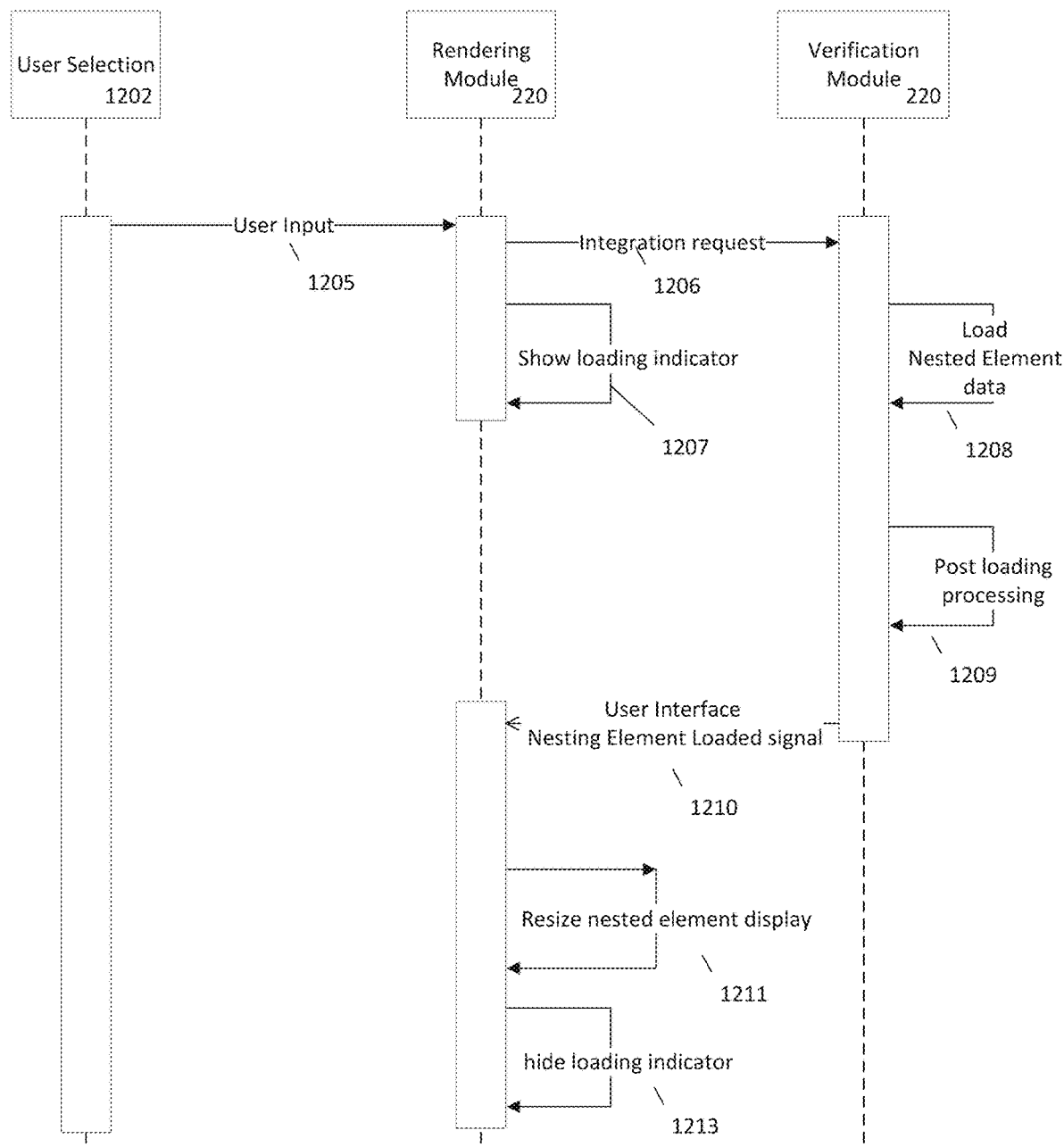
Figure 12B:
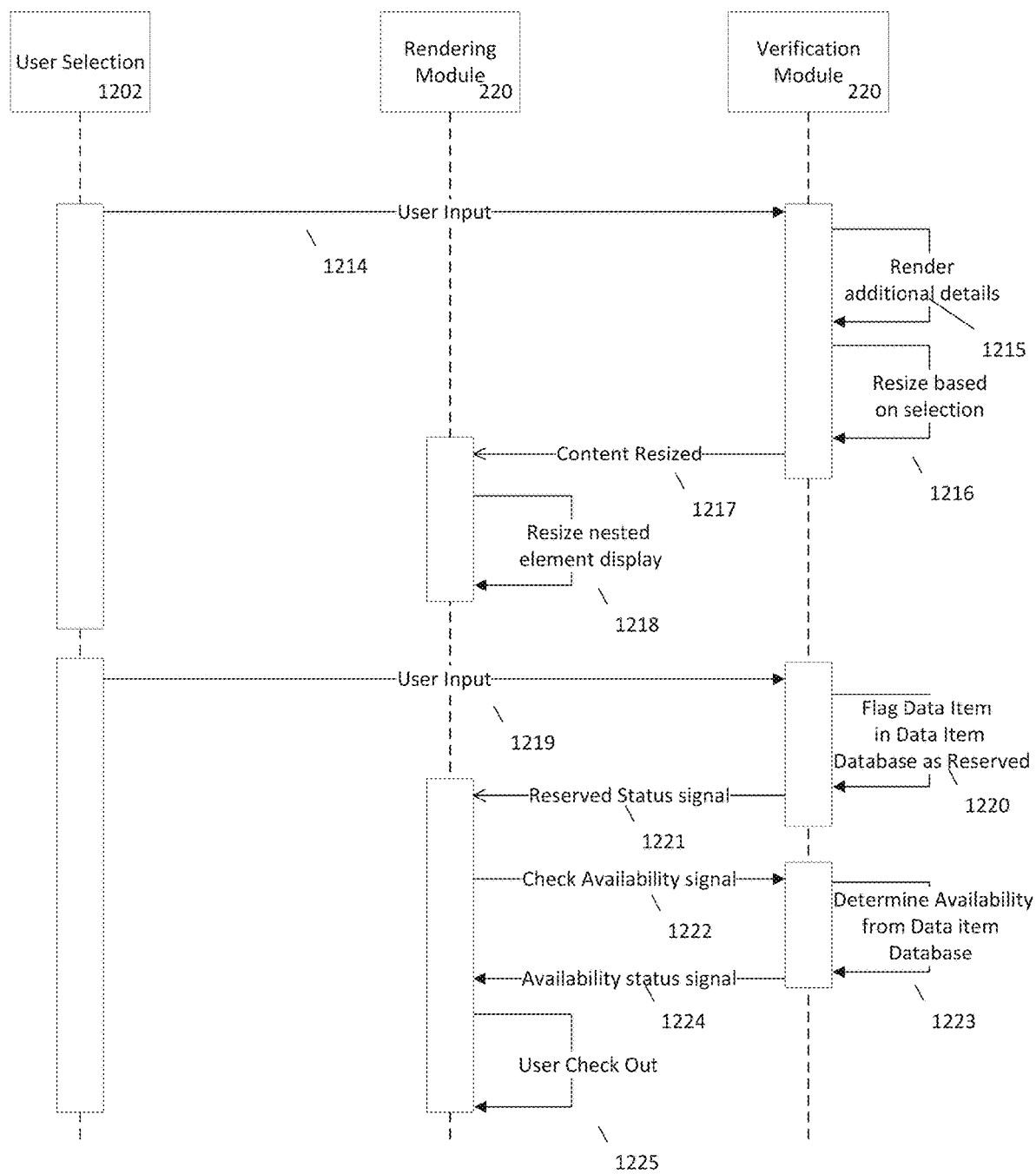
Figure 12C:
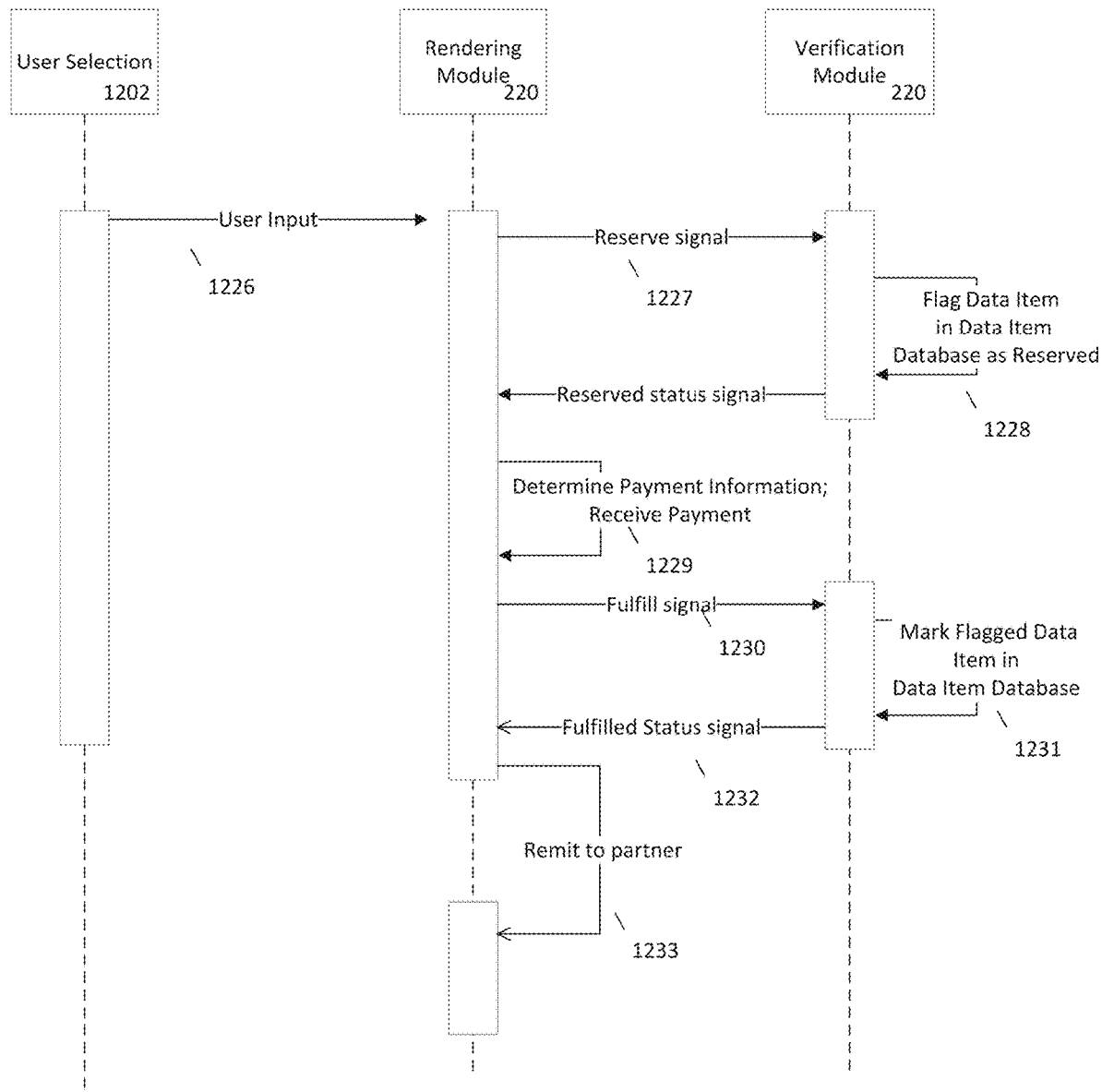
Figure 13:
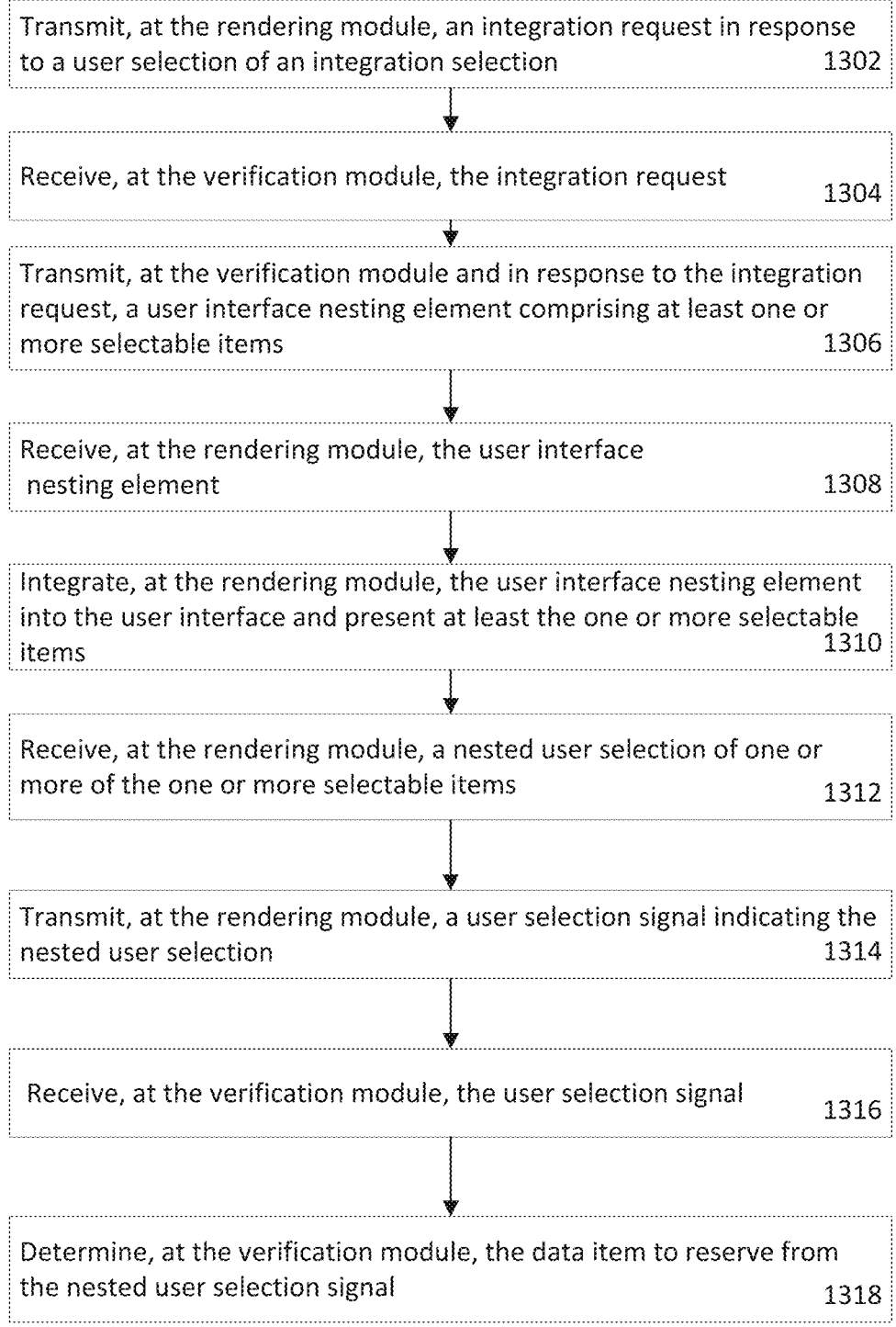

Having thus described certain embodiments of the present invention in general terms, reference will now be made to the accompanying drawings, which are not necessarily drawn to scale, and wherein:

FIG. 1A illustrates example networked computer platforms for ingesting data objects, rendering data objects, and updating a data item database structured in accordance with embodiments of the present invention;

FIG. 1B illustrates example networked systems for ingesting data items, rendering data items, and updating a data item database structured in accordance with embodiments of the present invention;

FIG. 2A shows a schematic block diagram of example circuitry for an ingestion system, according to some embodiments of the present invention;

FIG. 2B show a schematic block diagram of example circuitry for a validation, verification, and updating system, according to some embodiments of the present invention;

FIG. 3 illustrates an end point flow diagram of an ingestion system according to some embodiments of the present invention;

FIGS. 4A and 4B shows an example flow chart of a method for an ingestion system;

FIG. 5A illustrates an end point flow diagram of a validation, verification, and updating system according to some embodiments of the present invention;

FIG. 5B illustrates an additional end point flow diagram of a validation, verification, and updating system according to some embodiments of the present invention;

FIG. 6 illustrates an additional end point flow diagram of a validation, verification, and updating system according to some embodiments of the present invention;

FIG. 7 illustrates a current status state machine flow diagram according to some embodiments of the present invention;

FIGS. 8A and 8B illustrate an example flow chart of a method for a validation, verification, and updating system according to some embodiments of the present invention;

FIG. 9 illustrates an example flow chart of an additional method for a validation, verification, and updating system according to some embodiments of the present invention;

FIGS. 10A and 10B illustrate example flow charts of additional methods for a validation, verification, and updating system according to some embodiments of the present invention;

FIG. 11 illustrates an example flow chart of an additional method for a validation, verification, and updating system according to some embodiments of the present invention;

FIGS. 12A, 12B, and 12C illustrate an end point flow diagram of a validation, verification, and updating system according to some embodiments of the present invention;

FIG. 13 illustrates an additional method for a validation, verification, and updating system according to some embodiments of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention is embodied in many different forms and should not be construed as limited to the embodiments set forth herein; rather, these embodiments are provided so that this disclosure will satisfy applicable legal requirements. Like reference numerals refer to like elements throughout.

Definitions

As used herein, the terms "data," "content," "information," "signals," "feeds," and similar terms is used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a computer, mobile phone, or a similar integrated circuit in a server, a cellular network device, other network device, and/or other computing device.

As used herein, a "computer-readable storage medium," which refers to a physical storage medium (e.g., volatile or non-volatile memory device), is differentiated from a "computer-readable transmission medium," which refers to an electromagnetic signal.

As used herein, the terms "provider," "partner," and/or "merchant" refers to an individual or entity that is a source, and/or is associated with one or more sources, of a plurality of data objects, content contained within the data objects, and/or content to be displayed in connection with the data objects. For example, a partner, provider, or merchant is the owner and/or operator of a system or computer platform such as a data item provider platform that includes a flat file module, a data item database, and/or a verification module. The data item platform uses data items (such as in the form of deal offers, products, or other data objects) to provide product or offers for sale to a consumer through an ingestion and rendering platform, such as a deal website or mobile application.

As used herein, the term "user" refers to an individual or other entity that views and/or otherwise interacts with a rendering of one or more data objects on a user interface rendered by user interface circuitry, and by doing so, interacts with systems and/or other entities associated with a provider. Depending on the implementations of the particular systems associated with a viewer and/or a content source, a viewer is able to make and communicate selections from a rendered set of data objects via an interface directly and/or indirectly to an rendering module in communication with the provider's content source and/or other related system or entity, such as a verification module.

As used herein, "data object" includes one or more data sets or the like which are created or generated at one or more modules and reflects data including user selections, items, and states or conditions of various items. The data objects also cause or contain instructions to cause one or more actions to be taken by a module containing the data objects.

The term "validation, verification, and updating (VVU) system" refers to a system of modules including at least a validation module and a rendering module configured communicate and perform the embodiments described herein.

The term "flat file data object" refers to a data object stored, constructed, initiated, or otherwise created at the validation module representing a data item stored in a data item database. The flat file data object comprises strings, integers, Booleans, objects, and arrays of objects, arrays of integers, and arrays of Booleans representing a deal, offer, or product for sale.

The term "defined properties for ingesting the flat file data object" refers to properties for processing or ingesting a flat file data object. These properties include a property identification (i.e. schema version, offer title, offer images, offer provider etc.), property type (e.g. string, object, or array of objects, integers, and Booleans) and constraints for the property identification and type. The constraints include processing constraints and object constraints such as a string length requirement (e.g. max string length of 255 characters or a minimum length requirement), format requirement (e.g. URL (Uniform Resource Locator) or datetime), and requirement constraints (e.g. a property is required for processing).

The term "poll request" refers to a request for a flat file data object. In some examples, the poll request is periodically initiated from an ingestion module to a flat file module. In some examples, a poll request is initiated in response to an indication from a flat file module that a flat file data object is available or contains an update.

The term "renderable data object" refers to a data object stored, constructed, initiated, or otherwise created at the rendering module. The renderable data object is an array of parts parsed from a flat file data object. The renderable data object also represents a data item stored in a data item database either in an ingestion and rendering platform or remotely in a data item provider platform. An "internal renderable data object" may reside in an internal renderable object database and represent a data item stored on a data item database on an ingestion and rendering platform. An "external renderable data object" may by stored in an external renderable object database and represents a data item stored on a data item database stored on a data item provider platform.

The term "compliance" or "compliance status" refers to a determined compliance status such as complying or not complying with defined properties for ingesting a flat file data object. In some examples, each part of the array of parts of a renderable data object is compared with object constraints in the defined properties.

The term "candidate duplicate parts" refers to one or more parts of a renderable data object that is compared to previous renderable data objects to determine if the parts are duplicated. For example, one or more candidate duplicate parts in the array of parts of the renderable data object is compared against one or more duplicate parts stored in a deduplication database and/or a duplicate parts registry to generate a duplication score for the renderable data object.

The term "duplicate parts database" refers to a database which is stored on a deduplication module, or ingestion rendering platform which contains a record or registry of previously ingested renderable data objects and parts of renderable data objects in order to determine whether a current renderable data object is duplicated.

The term "user input" refers to a selection of an option or a data item presented to the user on a user interface utilizing user interface circuitry. A user interface may include a guided user interface found on a client device such as a mobile phone or personal computer.

The term "further user input" refers to a further selection of a previously selected user input. For example, a user may select a data item with a user input and then select to buy that data item through a further user input. The terms "user input" and "further user input" may also refer to the input of other data through a user interface such as user identifying information, information related to a checkout process or the like.

The term "user interface information" refers to any data or data items that is presented to a user. For example, a data item representing an object for purchase is presented as user interface information to a user on a user interface The term "check availability signal" refers to an electronic communication signal determined and transmitted at a rendering module which contains a request from a user input to obtain an availability of a user selected renderable data object.

The term "reserve signal" refers to a signal transmitted at a rendering module and contains a further user input indicating a further user selection of a user selected data item.

The term "fulfill signal" refers to a signal transmitted at a rendering module and contains an indication that a user selected data item is ready for fulfillment at a verification module. For example, the user selected data item may have been paid for, i.e. payment has been captured for the data item.

The term "availability status signal" refers to a signal transmitted at a verification module and contains a determined availability, i.e. the data item is available or is not available, of a user selected data item.

The term "reserved status signal" refers to a signal transmitted at a verification module and contains a reserved status of a user selected data item.

The terms "reserved status" and "current status" refer to a status of a user selected data item in the data item database on the data item provider platform. The status may include reserved, fulfilling, fulfilled, cancelling, and/or cancelled according to various embodiments.

The term "fulfilled status signal" refers to a signal transmitted at a verification module and indicates that the data item has been fulfilled or supplied to the user.

The term "payment information" refers to information gathered from a user through user input and includes information to charge a user for a data item. For example, payment information may include a credit number, addresses, and security code for processing a credit card payment. Payment information may also be stored in memory and retrieved from memory as needed.

The term "payment" refers to a process for capturing the payment including processing the payment information such that money is transferred or marked for transfer from the user account (such as the user's credit card) to the VVU system or corresponding partner. Once payment is made, a payment indication signal is processed by the VVU system indicating the payment is complete or captured.

The term "fulfillment status" refers to a status of whether the user selected data item on the verification module has been marked or flagged as fulfilled. For example, if the data item has been provided to a user, the data item is marked as fulfilled.

The term "availability status" refers to a status of whether a user selected data item is available for purchase to the user. For example, the item is unavailable if the user has purchased a determined limit of the item and/or the item is no longer in inventory on the verification module.

The term "payment status" refers to a status of whether payment has been captured by a rendering module. For example, if payment has not been captured by the rendering module, the payment status will indicate non-payment.

The term "ready for fulfillment" refers to a status of a user selected data item on a verification module that has been selected and the payment status has been determined to be paid.

The term "fulfilled" refers to a status of an order indicated that a user selected data item has been provided to a user, i.e. the process or order has been fulfilled.

In some example embodiments, a partner or provider of a product or deal may desire to offer their product, offer, or service on a purchase platform, such as a rendering and ingestion platform described herein, that has wider consumer distribution and/or an easy to use platform for purchasing the product, offer, or service. In some examples, the partner or provider, may also want to provide their own method or platform of offering their product, offer, or service for sale directly to a consumer. This presents a technical challenge wherein the provider or partner desires to offer its inventory of products, offers, or services, (i.e. data items stored in a data item database) on at least the wider distributed purchase platform while maintaining possession of the inventory so that it may provide the inventory for sale in other means.

Another technical challenge is presented in the offering of the product, offers, and services, alongside the products, offers, and services that are stored in a local inventory or data item database on the purchase platform.

For example, a concert venue may desire to both offer tickets for purchase on its own website or at its box office, while also providing tickets to a wider potential audience of people using an ingestion and rendering platform that is available to a wider audience. Example embodiments described herein allow for the concert venue to maintain possession of the concert ticket and integrate the ticket into a purchasing platform, such as an ingestion and rendering platform, with wider distribution among consumers. In some examples, the partner concert venue will create and/or store a flat file data object while complying with defined properties for integration into the ingestion and rendering platform. For example, the flat file data object representing the ticket will include constrained properties such as offer identification, images, pricing information etc. The flat file data object can be provided to the ingesting and rendering platform and ingested into the system utilizing an ingestion system so that a renderable data object is created to represent the ticket and can be presented for purchase in a validation, verification, and updating (VVU) system alongside other products, offers, and services. In some embodiments, the concert venue may also provide a nested element in the ingesting and rendering platform, such as an HTML (Hypertext Markup Language) iframe to allow for a selection of options directly with the concert venue, such as a selectable seat for a concert.

In another example, a travel tour company may offer tour offerings. Example embodiments described herein allow for the touring company to control the tour while also integrating the touring offering into a ingesting and rendering platform with wider distribution among consumers. In some embodiments, the touring company can also offer a nested element in the ingestion and rendering platform to aid in the selection of tour options, such as dates, how many people (and what age) are traveling, answer tour specific questions, etc.

Example System Architecture

Methods, apparatuses, and computer program products of the present invention is embodied by any of a variety of devices. For example, the method, apparatus, and computer program product of an example embodiment is embodied by a networked device, such as a server or other network entity, configured to communicate with one or more devices, such as one or more client devices. Additionally or alternatively, the computing device may include fixed computing devices, such as a personal computer or a computer work-station. Still further, example embodiments is embodied by any of a variety of mobile devices, such as a portable digital assistant (PDA), mobile telephone, smartphone, laptop computer, tablet computer, wearable, or any combination of the aforementioned devices.

FIG. 1A illustrates example networked computer platforms for ingesting data objects, rendering data objects, and updating a data item database in which embodiments of the present invention may operate. Users may access an ingestion and rendering platform 14 via a communications network 12 (e.g., the Internet, LAN, WAN, or the like) using client devices 11A-11N. Client devices 11A-11N may comprise any of a variety of mobile devices, such as a portable digital assistant (PDA), mobile telephone, smartphone, laptop computer, tablet computer, wearable, or any combination of the aforementioned devices providing a user interface. As illustrated in FIG. 1A, both the ingestion and rendering platform 14 and data item provider platform 16 comprise data item databases, such as data item database 54 and data item database 56 for storing a plurality of data items, including data items representing individual deals, products, services, and offers for purchase. The ingestion and rendering platform 14 also includes renderable object databases such as external renderable object database 50 and internal renderable object database 52. External renderable object database 50 is configured to store renderable data objects that represent data items stored remotely from the ingestion and rendering platform 14, such as those stored on data item database 56. Internal renderable object database 52 is configured to store renderable data objects that represent data items stored locally to the ingestion and rendering platform 14, such as those stored on data item database 54.

The ingestion and rendering platform 14 is in communication with a data item provider platform 16 through a communication network, such as communications network 12. As illustrated in FIG. 1A, ingestion and rendering platform 14 and data item provider platform 16 are in communication to form an ingestion system 100 and a VVU system 200 (FIG. 1B).

The ingestion system 100 includes an ingestion module 110, a compliance module 120, and deduplication module 130 in the ingestion and rendering platform 14 and a flat file module 140 on the data item provider platform 16. In one example embodiment, ingestion module 110, compliance module 120, and deduplication module 130 are embodied as a single software module or apparatus in an ingestion and rendering platform. The ingestion system 100 is described in further detail in relation to FIGS. 1B and 2A.

The VVU system 200 includes a rendering module such as rendering module 210 in the ingestion and rendering platform 14 and a verification module 220 on the data item provider platform 16. The VVU system 200 is described in further detail in relation to FIGS. 1B and 2B.

FIG. 1B illustrates example networked systems for ingesting data items, rendering data items, and updating a data item database structured in accordance with embodiments of the present invention. Ingestion system 100 includes necessary software module and engines to ingest a flat file data object from a data item provider platform 16 and determine a renderable data object from the flat file data object. As illustrated in FIG. 1B, the software modules include ingestion module 110, compliance module 120, deduplication module 130 on ingestion and rendering platform 14 and flat file module 140 on data item provider platform 16. While the data item databases are not shown as part of the ingestion system 100 in FIG. 1B, the various modules is in communication with the data item databases to determine various information from the databases and update data stored on the databases. Example functions and operations of ingestion system 100 are discussed in relation to FIGS. 3-4B.

Verification, validation, and updating (VVU) system 200 includes necessary software modules and engines to present a renderable data object to a user interacting with rendering module 210 and update a remote data item database, such as data item database 56, based on the user interactions. As shown in FIG. 1B, the software modules include rendering module 210 and verification module 220. While the data item databases are not shown as part of the VVU system 200, the various modules is in communication with the data item databases to determine various information from the databases and update data stored on the databases. Example functions and operations of VVU system 200 are discussed in relation to FIGS. 5A-7.

FIG. 2A is an example embodiment of an ingestion system, such as ingestion system 100 comprising an ingestion module, such as ingestion module 110 which comprises the ingestion module an ingestion processor and an ingestion memory including ingestion computer program code, a compliance module, such as compliance module 120 comprising, a deduplication module, such as deduplication module 130, and a flat file module, such as flat file module 140 (which may also be embodied as a flat file server independent of the other modules). In some example embodiments, ingestion module 110, compliance module 120 and deduplication module 130 are embodied as one module. In some examples, the flat file module, such as flat file module 140 is maintained by a partner or provider. In some examples, a partner or provider may periodically update the flat file module to manage an inventory of offers or products for sale stored on a data item database 56. In some examples, the partner or provider maintains the flat file module to reflect a removed offer or product from the inventory, by removing a flat file data object from the data item database 56.

As shown in FIG. 2A, ingestion module 110 comprises processor 111, memory 112, ingestion circuitry 113, communication circuitry 114, and security circuitry 115. In some embodiments, as processor 111 or ingestion circuitry 113, are configured parse the flat file data object into a renderable data object comprising an array of parts according to defined properties for ingesting the flat file data object. In some example embodiments, the defined properties for ingesting the flat file data object can be stored in memory, such as memory 112. In some examples, the defined properties is stored in memory remote from ingestion system 100 and accessed by ingestion module 110 through communication circuitry 114.

In some embodiments, communication circuitry 114 is configured to transmit a poll request to the flat file module requesting a flat file data object, receive the flat file data object, wherein the flat file data object contains at least one of strings, integers, Booleans, objects, arrays of objects, arrays of Booleans, arrays of strings, or arrays of integers, transmit the renderable data object to the compliance module and the deduplication module, and store the renderable data object in a renderable object database. In some examples, the poll request is a poll request for a flat file data object. In some examples, the poll request is initiated by an indication that a partner has a flat file data object which is ready to be received by the ingestion module 110. In some examples, the poll request is a periodic request configured to ensure that the ingestion object is an up to date ingestion object representing the most current flat file data object. In some examples, the poll request is polled at a configurable cadence based on how often a feed (or flat file object) updates, performance limitations of loading a feed, or other considerations.

As shown in FIG. 2A, ingestion system 100 also comprises a flat file module comprising a flat file processor and a flat file memory including flat file computer program code embodied as flat file module 140. In some example embodiments, flat file module 140 comprises processor 141, memory 142, flat file circuitry 143, communication circuitry 144, and security circuitry 145. In some examples, communication circuitry 144 is configured to receive the poll request from the ingestion module, transmit the flat file data object to the ingestion module, and receive a compliance alert and duplication score. The flat file data object may contain strings, integers, Booleans, objects and arrays of objects, strings, integers, Booleans. In some examples, the flat file data object is formatted as JSON (JavaScript Object Notation) or XML (eXtensible Markup Language). In some examples, flat file module 140 is maintained by a partner or provider to provide offers or products for purchase, stored as flat file data object or data items on a data item database such as data item database 56.

In some further examples, the flat file module, including flat file circuitry 143, is configured to aggregate or combine different data sources. For example, the data sources is stored on the same partner system (such as data item provider platform 16) or the data sources may reside on multiple systems between the partner, partners, or other sources. Additionally, the flat file data object may comprise multiple files which contain disparate information which is aggregated and combined to include all required information. In some examples, the flat file data object may include only partial object data representing any changes that may need to be applied to a renderable data object.

As also shown in FIG. 2A, ingestion system 100 also comprises a compliance module comprising a compliance processor and a compliance memory including compliance computer program code embodied as compliance module 120. Compliance module 120 comprises processing circuitry, such as processor 121 or compliance circuitry 123, configured to determine compliance of the renderable data object by comparing each part of the array of parts with object constraints in the defined properties to identify one or more non-compliant parts of the renderable data object. For example, object constraints may comprise a feed schema including properties of the feed and constraints of the feed. In some examples, the feed schema may include property of the particular part of the schema and Boolean conditions to determine requirements of the schema. In some examples, the compliance module 120 is also configured to determine a compliance alert that identifies the one or more non-compliant parts of the renderable data object. The compliance module 120 also comprises communication circuitry, such as communication circuitry 124, configured to transmit the compliance alert to the flat file module.

As also shown in FIG. 2A, ingestion system 100 comprises a deduplication module comprising a deduplication processor and a deduplication memory including deduplication computer program code embodied as deduplication module 130. In some embodiments, deduplication module 130 may comprise processing circuitry, such as deduplication circuitry 133, configured identify one or more candidate duplicate parts from the array of parts and compare the candidate duplicate parts from the array of parts with a part registry stored to a deduplication database to generate a duplication score for the renderable data object. In some examples, deduplication module 130 also comprises communication circuitry, such as communications circuitry 134, configured to output the duplication score for the renderable data object. In some examples, outputting the duplication score may comprise transmitting the duplication score to the ingestion module 110 and/or flat file module 140.

FIG. 2B illustrates an example embodiment of a VVU system, such as VVU system 200, comprising a rendering module comprising a rendering processor and a rendering memory including rendering computer program code embodied as rendering module 210, and a verification module a verification processor and a verification memory including verification computer program code embodied as verification module 220. As illustrated in FIG. 2B, rendering module 210 comprises a processor 211, memory 212, user interface circuitry 213, rendering circuitry 214, communication circuitry 215, security circuitry 216, property determination circuitry 217, and payment circuitry 218.

VVU system 200 also comprises verification module 220. In some examples, verification module 220 comprises a processor 221, memory 222, reservation circuitry 223, nested element circuitry 224, communication circuitry 225, security circuitry 226, property determination circuitry 227, and fulfillment circuitry 228.

As shown in FIG. 2B, rendering module 210 comprises a user interface circuitry, such as user interface circuitry 213, configured to receive a select input from the user interface, wherein the select input is triggered by a user selection of a renderable data object via the user interface, receive a confirm selection input from the user interface, wherein the confirm selection input is triggered by a further user selection of the renderable data object, and output an availability status to the user interface. In some examples, the user interface circuitry interacts with a user interface display on client devices 11A-11N. In some example embodiments, user interface circuitry 213, is further configured to receive a user interface nesting element integrate the user interface nesting element into the user interface and present at least one or more selectable items to a user, and receive a nested user selection of one or more of the one or more selectable items.

As shown in FIG. 2B, rendering module 210 also comprises communication circuitry, such as communication circuitry 215, configured to transmit a check availability signal upon determining that the renderable data object is externally sourced, transmit a check availability signal, receive an availability status signal in response to the check availability signal, transmit a reserved status signal in response to the receiving the confirm selection input, receive a payment indication signal; and transmit a fulfill status signal in response to receiving the payment indication signal.

The rendering module 210 also comprises processing circuitry such as processor 211, rendering circuitry 214, property determination circuitry 217, and/or payment circuitry 218 configured to determine that the renderable data object associated with the select input is externally sourced.

As shown in FIG. 2B, VVU system 200 also comprises verification module 220. In some examples, verification module 220 comprises a processor 221, memory 222, reservation circuitry 223, nested element circuitry 224, communication circuitry 225, security circuitry 226, property determination circuitry 227, and fulfillment circuitry 228. In some examples, communication circuitry 225 is configured to receive the check availability signal from the rendering module, transmit the availability status signal to the rendering module based on the availability data, receive the reserved status signal from the rendering module, receive the fulfill status signal from the rendering module and transmit a fulfill order signal in response to receiving the fulfill status signal.

Verification module 220 also comprises processing circuitry such as processor 221, reservation circuitry 223, property determination circuitry 227, and fulfillment circuitry 228 configured to determine availability data based on the check availability signal and update the data item database to indicate a reserved status for a data item associated with the renderable data object upon receiving the reserved status signal.

In some embodiments, security circuitry 216, of the rendering module and security circuitry 226 of the verification module are configured to add security features during the transmission of each of the data objects and signals and parse the security features during the reception of each of the data objects and signals.

FIG. 3 illustrates an endpoint flow diagram according to some embodiments of the present invention. In some embodiments, the endpoints of FIG. 3 represent endpoints of an ingestion system according to the method referred to in FIGS. 4A and 4B. In some embodiments, the endpoints of FIG. 3 represent communication and processes of ingestion module 110, flat file module 140, and a VVU system 200 (such as rendering module 210 as part of an ingestion and rendering platform 14). At step 310, the ingestion module 110 is configured to transmit a load feed signal or poll request, in some examples, the poll request is implemented using a HTTP (Hypertext Transfer Protocol) GET, SFTP (Secure File Transfer Protocol) or FTP (File Transfer Protocol). In some examples, the load feed signal is a poll request requesting a flat file data object. At step 315, flat file module 140 is configured to process the load feed request by determining a flat file data object to transmit. The flat file data object may be determined by flat file module 140 to include the required data parts to represent a data item stored in a data item database such as data item database 56. The flat file data object may be also be previously stored in data item database 56. At step 320, flat file module 140 is configured to transmit a data object feed. In some examples, the data object feed includes a flat file data object, containing strings, integers, Booleans, objects, and arrays of objects, arrays of Booleans, arrays of strings, and arrays of integers. At step 325, ingestion module 110 is configured to process the feed by parsing the flat file data object into a renderable data object comprising an array of parts according to defined properties for ingesting the flat file data object and transmitting the renderable data object to a compliance module and a deduplication module. In some examples, step 325 further includes processing of the feed for compliance and deduplication properties as described in relation to FIGS. 4A-4B. At step 330 compliance module 120, is configured to transmit a compliance feed including a compliance alert to flat file module 140. At step 335, flat file module 140 is configured to process the compliance feed, such as the noncomplying parts to determine which parts of the flat files data objects need to be corrected or updated to comply with the object constraints. At step 340, the ingestion module 110 is configured to transmit and manage offers to VVU system 200 by updating the external renderable object database 50. In some examples, issuing and managing offers may comprises storing the renderable data object in a renderable object database according to the method described in relation to FIGS. 4A and 4B.

FIGS. 4A and 4B show an example flowchart of a method for ingesting a data object utilizing an ingestion system as part of an ingestion and rendering platform. Steps of the method of FIGS. 4A and 4B may also be represented by the endpoint flow diagram of FIG. 3. At block 402, the ingestion system, such as ingestion system 100, is configured to transmit, at ingestion module 110, a poll request to a flat file module requesting a flat file data object.

At block 404, the ingestion system, such as ingestion system 100, is configured to receive, at the flat file module 140, the poll request from the ingestion module 110. In some examples, the flat file data object is stored in memory 142 of the flat file module. In another example, the flat file module is configured to determine, at the flat file module and in response to the poll request from the ingestion module, the flat file data object from a data item stored in a data item database, wherein the flat file data object can be parsed into the renderable data object representing the data item; and transmit, at the flat file module, the flat file data object to the ingestion module.

In some examples, the flat file data object is an updated flat file data object of a previously ingested data object. In one example, the flat file module 140 is configured to identify, at the flat file module, a change in the data item stored in the data item database, after transmitting the flat file data object to the ingestion module, determining, at the flat file module, a feed update indicating the identified changed to the data item, and cause, at the flat file module, an update to a previously ingested renderable data object by transmitting an updated flat file data object with the determined feed update. The ingestion system 100 is also configured to receive, at the ingestion module 110, the updated flat file data object from the flat file module; and update, at the ingestion module, the previously ingested renderable data object according to the updated flat file data object.

In another example, the flat file module 140 is configured to remove an ingestion object from an ingestion system of an ingestion and rendering platform by causing a removal of a previously ingested renderable data object from the renderable object database by generating, at the flat file module, a removal signal identifying the previously ingested renderable data object and transmitting the removal signal to the ingestion module. The ingestion module 110 is also configured to receive, at the ingestion module and from the flat file module, a removal signal identifying a previously ingested renderable data object and remove, at the ingestion module, the previously ingested renderable data object from the renderable object database. In some examples, the flat file data object may also comprise categories for the flat file data object and default value overrides for the ingestion object. In each of these cases, during the determination of the renderable data object described below, the categories and default overrides will be included in the determination of the data object. In some examples, flat file module 140 is configured to receive and process the poll request, determine a correct flat file data object to transmit or aggregate a flat file from source data according to the poll request, and transmit the flat file data object. In some examples, block 402 corresponds to step 310 of FIG. 3. In one example, the poll request may also request a flat file data object from a local flat file module. In some examples, security encryption and decryption are performed on the communication between the various modules of ingestion system 100.

At block 406, the ingestion system, such as ingestion system 100, is configured to transmit, at the flat file module 140, the flat file data object to the ingestion module 110.

At block 408, the ingestion module, such as ingestion module 110, is configured to receive, at the ingestion module 110, the flat file data object, wherein the flat file data object contains at least one of strings, integers, Booleans, objects, arrays of objects, arrays of Booleans, arrays of strings, or arrays of integers. In some examples, the flat file data object is received from flat file module 140. In some examples, the flat file data object may be stored at the ingestion module in memory 112. In some examples, the flat file data object is received by communication circuitry 114. In some examples, block 408 corresponds to steps 315 and 320 of FIG. 3.

At block 410, the ingestion module, such as ingestion module 110, is configured to parse, at the ingestion module 110, the flat file data object into a renderable data object comprising an array of parts according to defined properties for ingesting the flat file data object. In some examples, the flat file data object is parsed by processor 111 and/or ingestion circuitry 113 according to the defined properties for processing a flat file data object. In some examples, parsing the flat file data object may include validating the data for correctness and compliance with data object constraints.

At block 412, the ingestion module, such as ingestion module 110, is configured to transmit, at the ingestion module 110, the renderable data object to the compliance module 120 and the deduplication module 130.

At block 414, the ingestion system 100 is configured to determine, at the compliance module 120, compliance of the renderable data object by comparing each part of the array of parts with object constraints in the defined properties to identify one or more non-compliant parts of the renderable data object. Determining compliance may be accomplished by processor 121 and/or compliance circuitry 123.

At block 416, the ingestion system 100 is configured to determine, at the compliance module 120, a compliance alert that identifies the one or more non-compliant parts of the renderable data object.

At block 418, the ingestion system 100 is configured to transmit, at the compliance module 120, the compliance alert to the flat file module 140. In some examples, the ingestion system 100 is also configured to determine, at the compliance module 120, one or more compliance solutions for each of the one or more non-compliant parts, wherein the one or more compliance solutions comprise a change to the renderable data object or the flat file data object that will make the one or more non-compliant parts compliant, and wherein determining the compliance alert further comprises including the determined one or more compliance solutions for each of the one or more non-compliant parts as an element of the compliance alert. In some examples, referring back to FIG. 3, this is part of the step 330.

In some examples, the ingestion system 100 is also configured to determine, at the compliance module 120, a compliance action for each of the one or more compliance solutions, wherein the compliance action, when executed by the compliance module changes the renderable data object such that the one or more non-compliant parts become compliant, and updating, at the compliance module 120, the renderable data object according to the compliance action. For example, an image in the renderable data object must meet certain restrictions (e.g. size and aspect ratio constraints). If the image specified in the renderable data object does not match these restrictions, the compliance solution and action comprises a suitable stock image selected from a pool of images, which may be stored on the ingestion module. The compliance action comprises assigning the suitable stock image to that ingestion object instead of the image specified in the renderable data object. Another example compliance solution and action, is that if a title in the renderable data object is too long (exceeds length restrictions), it will be truncated to an appropriate length. As further example, a renderable data object may include a category id, which must exist in a defined enumeration of valid category ids. If the category id specified in the renderable data object does not exist in the enumeration, that value is discarded (i.e. deleted entirely).

In some examples, the ingestion system 100 is also configured to receive, at the flat file module 140, the compliance alert from the compliance module, and update, at the flat file module 140, the flat file data object according to the one or more compliance solutions received in association with the compliance alert. In some examples, referring back to FIG. 3, this is part of the step 335.

At block 420, the ingestion system 100 is configured to identify, at the deduplication module 130, one or more candidate duplicate parts from the array of parts.

At block 422, the ingestion system 100 is configured to compare, at the deduplication module 130, the candidate duplicate parts from the array of parts with a part registry stored to a deduplication database to generate a duplication score for the renderable data object. In some examples, the deduplication database is stored in memory 132. In some examples, the deduplication database is stored in a VVU system described in reference to FIGS. 1B and 2B.

In some examples, ingestion module 110 is configured to determine, at the deduplication module 130 and from the duplication score, a deduplication action, determine, at the deduplication module 130, a deduplication recommendation, wherein the deduplication recommendation comprises a change to the flat file data object, at the flat file module, that will lower the duplication score, determining, at the deduplication module 130, a duplicate alert that identifies the duplication score, the deduplication action, and the deduplication recommendation, and transmit, at the deduplication module 130, the duplicate alert to the flat file module 140.

In some examples the deduplication action comprises one or more of updating, at the deduplication module 130, the renderable data object with an indication as an alternate renderable data object, and/or updating, at the deduplication module 130, the renderable data object with an indication as a rejected renderable data object. In some examples, the ingestion system 100 is configured to update, at the deduplication module 130, the renderable data object according to the deduplication action.

At block 424, the ingestion module, such as ingestion module 110, is configured to output, at the deduplication module, the duplication score for the renderable data object. In some examples, outputting may comprise transmitting the duplication score, deduplication action, and/or the deduplication score to the ingestion module 110 and/or the flat file module 140.

In some examples, the ingestion module 110, is configured to receive, at the flat file module 140, the deduplication recommendation from the deduplication module 130, and update, at the flat file module 140, the flat file data object according to the determined deduplication recommendation.

In some examples, the ingestion module 110, is configured to output, at the deduplication module, the renderable data object and the duplication score for the renderable data object to the ingestion module.

At block 426, as ingestion module 110, is configured to store, at the ingestion module 110, the renderable data object in a renderable object database. In some examples, storing the renderable data object corresponds to updating the external renderable object database 50 at step 340 described in relation to FIG. 3. In some examples, storing the renderable data object comprises issuing the ingestion object to a VVU system such as a VVU system 200 as part of an ingestion and rendering platform, such that an offer or product is offered for sale on the VVU system. In some examples, issuing the ingestion object may comprise removing an ingestion object from the VVU system such that an offer or product is removed from a VVU system 200. In some examples, a signal is made to the VVU and/or the verification module to do one of the following things: 1) insert new data into external renderable object database 50 2) update existing data in external renderable object database 50 with new data 3) deactivate existing data in external renderable object database 50 including either existing renderable data objects, or non-ingestion data.

FIG. 5A illustrates an end point flow diagram of a VVU system, such as VVU system 200, according to some embodiments of the present invention. In some examples, the endpoints represent endpoints of the VVU system according to the methods referred to in FIGS. 8A, 8B, 9, 10A, and 10B. In some embodiments, the endpoints represent communication and operations of rendering module 210 and verification module 220 as part of VVU system 200 in an ingestion and rendering platform. In some examples, FIG. 5A is an example of a synchronous VVU system.

In FIG. 5A, rendering module 210 is configured to be in communications with verification module 220. At step 502, the rendering module is configured to transmit a check availability signal. At step 504, the verification module 220 is configured to determine availability from a data item database. At 506, the verification module 220 is configured to transmit an availability signal. In some embodiments, steps 502, 504, and 506 are used to determine availability and pricing for a specific product and attribute combination in relation to a user selection, as contained in a check availability signal. The availability is based off of real-time sources at the verification module, such as the data stored in data item database 56. The verification module 220 may also be configured to implement a temporary hold on inventory and return reserved units in the availability response as contained in an availability status signal. If a verification module 220 has unlimited inventory, this endpoint is still implemented. The verification module 220 may also return a product not available error if the product is no longer offered for purchase according to data stored in the data item database 56.

In some examples, the verification module 220 is configured to determine from the check availability signal and data item database if the user selection or data item is eligible for or includes an input field. In some examples, if the user selection or data item contains an input field, the verification module 220 is configured to transmit the input field to the rendering module to allow the user input and to select certain features from a rendered embedded input fields, as described in relation to FIG. 5B.

At step 508, the rendering module is configured to process a user checkout. In some examples, this may include a user further selecting a product for purchase and entering information such as address, payment, and other identification information. In some examples, this information is stored as for further processing on the ingestion and rendering platform 14.

At step 510, rendering module 210 is configured to transmit a reserve signal. At step 512, the verification module is configured to determine a reservation by searching a data item database and flagging a data item in the data item database as reserved. At step 514, the verification module is configured to transmit a reserved status signal. In some embodiments, steps 510, 512, and 514 are configured to put an indefinite hold on a data item (e.g., a data item representing inventory) at verification module 220. This can take the form of either a specific unit of inventory identified in the check availability signal, or a general unspecified unit of inventory residing on the data item database. The reserved units should "belong" to the purchaser, and should not expire or be released unless cancel is explicitly signaled. In some examples, the data item should also not be released to the user until it has been fulfilled. In the case that a previously reserved unit (i.e. a temporary hold from the check availability signal) is no longer available, this should be treated as an availability failure, returning an indication the data item (product) is not available. The status of the data item (user selected product), in the data item database after this signal should be "reserved".

At step 516, the rendering module is configured to process a payment by determining payment information and receiving payment, such as receiving an indication or signal that payment is completed. In some examples, rendering module 210 may utilize the payment information determined in step 508. In some examples, rendering module 210 gathers additional payment information from the user, such as through a user interface, at step 516.

At step 518, the verification module is configured to transmit a fulfill signal. At step 520, the verification module is configured to determine a fulfillment signal to determine fulfillment of the data item in the data item database. At step 522, the verification module is configured to transmit a fulfilled signal. In some embodiments, steps 518, 520, and 522 are configured to transition a data item in the "reserved" state, as in step 514, to a "fulfilled" state. The fulfilled state indicates that the payment has been captured by the rendering module 210, and the data item (reserved user selected product or data item) is now able to be fulfilled by the verification module or provider. Purchased inventory should not be released to the user until it is fulfilled. It is considered valid for this endpoint to be invoked on a "fulfilled" or "fulfilling" reservation, but not a "cancelled", "cancelling", or "reserving" data item as described in further detail as the post reserve current status in relation to FIG. 7 state machine flow diagram. For example, the status of the data item after this signal should be "fulfilling" or "fulfilled." The status should be set to "fulfilling" until the data item or inventory represented by the data item has been shipped (for shipping products) or an electronic form is available (for electronic fulfillment type products). Once this occurs, the status can be changed to the final "fulfilled" status. The determination of the status and the change from one state to another can be determined by the verification module (i.e. the provider).

In some examples, rendering module 210 is also configured to transmit a cancel signal. At step 550, verification module is configured to process and determine cancellation at step 552. At step 554, verification module is configured to transmit a cancelled signal. In some examples, steps 550, 552, and 554 are configured to transition a data item in the "reserved," "fulfilled," or "fulfilling" state to the "canceled" state. This indicates that the reservation of the data item is now void, and should not be fulfilled or redeemed for the user. In this instance the verification module 220 (i.e. provider) should not allow fulfillment and/or redemption for the user if at all possible. It is considered valid for this endpoint to be invoked on a data item for any status; however, not all data items on data item database 56 are allowed to be canceled (e.g. the data item's current status does not allow a cancel or the time window for cancellation has elapsed). The status of the data item (reserved user selected product or inventory data item) after this signal should be "cancelling" or "cancelled".

FIG. 5B illustrates an endpoint flow diagram according to some embodiments of the present invention including a VVU system, such as VVU system 200. In some examples, the endpoints represent endpoints of the VVU system according to the method referred to in FIG. 9. In some embodiments, the endpoints represent further communication and processing of rendering module 210 and verification module 220 as part of VVU system 200 in an ingestion and rendering platform.

In FIG. 5B, rendering module 210 is configured to be in communication with verification module 220. At step 502, the rendering module is configured to transmit a check availability signal. At step 504, the verification module is configured to determine availability from a data item database. At step 570, the verification module is configured to lookup or determine input fields, if the availability indicates there are corresponding input fields. At step 572, the verification module is configured to transmit an availability status signal including both the determined availability and the input fields. In some embodiments, steps 502, 504, 570 and 572 are used to determine availability and pricing as well as if there are input fields for a specific product and attribute combination in relation to a user selection, as contained in a check availability signal. These field may supports storing custom input fields, prefilling fields based on user data and the user selection, and validating data formats of inputs supplied by users during the checkout process. The input field may be used by the rendering module for multiple users and in relation to multiple verification modules. The availability is based off of real-time sources at the verification module such as what is stored in a data item database. The verification module may also be configured to implement a temporary hold on a data item and return a reserved status signal as well as input fields in the availability response as contained in an availability object. If a verification module has unlimited inventory this endpoint is still implemented and returns a product not available error if the product is no longer offered for purchase.

At step 574, the rendering module is configured to render the availability and render the input fields to the user. The input fields are rendered as input fields in an input portion in a user interface. The input fields may be of unlimited number based on the input fields sent from the verification module 220. For example, rendering module 210, may render input fields for a group, a Boolean input, an email, a phone number, a text input, a numerical input or other inputs such as a radio button or drop down selection. The radio buttons or drop down selection choices may also be provided by the verification module in the input fields.

At step 576, the rendering module is configured to process a user checkout. In some examples, this may include a user inputting information into the input fields rendered in step 574 and further selecting a rendered product for purchase.

At step 578, the rendering module is configured to transmit a reserve units signal. This reserve units signal will include the user input information inputted by the user at step 576 and will be processed by verification module at step 512. At step 580, the verification module is configured to store the user input with a data item in the data item database. The process may then continue as shown by FIG. 5A continuing at step 512.

FIG. 6 illustrates an endpoint flow diagram according to some embodiments of the present invention including a VVU system, such as VVU system 200. The endpoints representing the endpoints of the VVU system and according to the method referred to in FIGS. 8A-8B and 10A-10B and representing communication and operations of rendering module 210 and verification module 220 as part of VVU system 200 of an ingestion and rendering platform. In some examples, FIG. 6 represents an asynchronous system.

Steps 602 through steps 618 are substantially similar to steps 502 through steps 518 as described in relation to FIG. 5A.

At step 620, the verification module is configured to process a fulfillment by marking the flagged data item in the data item database. In some examples, at step 622, verification module 220 is configured to transmit a fulfilling status signal. This is a different signal than the fulfilled signal shown in step 522 in FIG. 5A. The fulfilling status signal indicates that the data item (i.e. offer or product) is in the process of being fulfilled as the result of a synchronous signal. In some examples, the rendering module 210 will then transmit asynchronous polls for status changes to determine the state changes of the data item (reserved user selected product or inventory data item) as described in relation to FIG. 7.

In some examples, the rendering module 210 is configured at step 650 to transmit a retrieve status signal. In some examples, verification module 220 is configured at step 652 to process a determined status by searching a data item database and determining the current status of a data item. At step 654, verification module is configured to transmit a current status signal, wherein the result signal contains a current status of the order represented as data objects according to the post-reserve states described in relation to FIG. 7.

At step 660, in some examples, rendering module 210 is configured to transmit a cancel signal. This is in response to a user request to transmit a cancel signal or some other function of the interaction system determines a cancel signal is required (i.e. a returned payment). At step 662, in some examples, the verification module 220 is configured to process a cancellation status by searching data item database 56 to determine the cancellation or current status of a data item and transitioning the data item to a cancelling status. At step 664, the verification module, such as verification module 220, is configured to transmit a cancelling signal. In some examples, the cancelling signal will indicate a state such that the order is not finally cancelled but is proceeding to the cancelled state.

In some examples, at step 670, the rendering module is configured to process a retrieve status signal. At step 672, the verification module is configured to process a determined status. In step 674, verification module is configured to transmit a result signal, wherein the result signal contains a current status of the order or data item (reserved user selected product or inventory data item) according to the post-reserve states described in relation to FIG. 7. Steps 670, 672, and 674 are substantially similar to steps 650, 652, and 654.

FIG. 7 is an example state machine flow diagram according to some embodiments of the present invention. A data item (reserved user selected product or inventory data item), such as those flagged at steps 512 and 612 of FIGS. 5A and 6, may transition amongst the states shown in FIG. 7 in a one-way directional order through each state. A data item does not need to transition through each state, nor does it need to pass through each state (e.g. a data item can jump immediately to "fulfilled" and skip the "fulfilling" state). To account for both asynchronous and synchronous processing by a partner, each actual state is represented by a "processing" and "processed" state at each step. This allows the verification module (i.e. provider or partner) to control when the transition of the data item status happens, even if it is asynchronous from a request from the rendering module. In some examples, polling may occur at the rendering module while asynchronously processing data items until they hit their next processed state. Periodic polling may also occur from the rendering module 210 to reconcile any state which has changed in the data item database.

In some examples, a data item may proceed from a reserved status at block 725 to a fulfilling status at block 745. This corresponds to a determined fulfillment at step 520 or a fulfillment step 620. In some examples, a data item can proceed directly to a cancelling status at block 775, if the rendering module 210 transmits a cancel signal before a fulfill signal. In some examples, a data item may proceed from a fulfilling status at block 745, to a fulfilled status at block 750. The verification module, such as verification module 220, will determine the acceptable scope and conditions of data item proceeding from fulfilling 745 to fulfilled 750.

In some examples, a data item may proceed from the fulfilling status at block 745 or a fulfilled status at block 750, to a cancelling status at block 775. In some examples, this is in response to the rendering module 210 issuing a cancel signal while the verification module is processing a fulfillment. The verification module 220 may in some examples not proceed to a cancelling status at block 775, if certain conditions of the data item restrict a cancellation of the data item. In another example, the verification module 220 may not proceed to a cancelling status, but the rendering module 210 may force a cancellation at the rendering module side. This may result in the rendering module 210 and verification module 220 having different statuses for a data item. In some examples, the data item may proceed from a cancelling status at block 775 to a cancelled status at block 780 indicating that the reservation is cancelled.

FIGS. 8A and 8B illustrate an example flowchart of a method for updating a data item data base using a VVU system, such as the methods represented by FIGS. 5A-5B and 6. In some examples, a VVU system comprises VVU system 200. At block 802, the VVU system 200 is configured to receive, at the rendering module 210, a select input from a user interface, wherein the select input is triggered by a user selection of a renderable data object via the user interface. In some examples, the select input can be received through user interface circuitry 213. In some examples, the selection of renderable data object comprises selecting a rendered component of the renderable data object corresponding to an offer or product representing a data item stored in data item database 56 and ingested by ingestion system 100 and transmitted to the VVU system 200. For example, the user may select a renderable data object representing a concert ticket stored as a data item in data item database 56.

In block 804, the VVU system 200 is configured to determine, at the rendering module 210, that the renderable data object associated with the select input is externally sourced. In some examples, property determination circuitry 217 is configured to determine if the renderable data object is an external renderable data object (e.g., represents or refers to a data item stored remotely from the rendering module and/or is stored in external renderable object database 50). In some examples, if the renderable data object is not an external renderable data object (i.e. an internal renderable data object) a substantially similar method as described herein may execute on a local platform or sever.

In block 806, the VVU system 200 is configured to, upon determining that the renderable data object is externally sourced, transmitting, at the rendering module, a check availability signal. In some examples, the check availability signal comprises an identification of the user selected renderable data object, such as the renderable data object selected in block 802. For example, the check availability signal may comprise an identification of data items stored in data item database 56 represented by the renderable data object corresponding to concert ticket selected by the user. In some examples, the check availability signal is transmitted by communication circuitry 215.

At block 808, the VVU system 200 is configured to receive, at a verification module 220, the check availability signal from the rendering module. In some examples, the check availability data signal is received by communication circuitry 225.

At block 810, the VVU system 200 is configured to determine, at the verification module 220, availability data based on the check availability signal. In some examples, processing circuitry such as property determination circuitry 227 is configured to determine which data item stored in data item database 56 for which to check availability. For example, property determination circuitry 227 may determine from the check availability data object a data item representing the concert ticket selected by the user at block 802. In some examples, the data item database 56 is stored or accessed on memory 222. In some examples, property determination circuitry, such as property determination circuitry 227, is configured to determine from the data item database an availability of the determined data item. For example, property determination circuitry 227 may query the data item database to determine if the concert ticket data item from the determined data item is still available for purchase. Since there is only one ticket and its status is controlled by the verification module, the determination from the data item database of whether the ticket is still available for purchase is the controlling determination for whether the ticket is available for purchase. In some examples, the verification module may indicate that the determined data item is associated with input fields may follow a method as described in relation to FIGS. 9A and 9B.

At block 812, the VVU system 200 is configured to transmit, at the verification module 220, an availability status signal to the rendering module based on the availability data. In some examples, the availability status signal is transmitted by communication circuitry 225. For example, property determination circuitry 227 may determine that the ticket is still available for purchase. Communication circuitry 225, may then be configured to transmit a signal with the ticket identification data and an indication that the ticket still available for purchase. In other examples, the ticket may not be available or is currently reserved, thus communication circuitry 225 will transmit a signal with an indication of the determined availability, such as not available for purchase.

At block 814, the VVU system 200 is configured to receive, at the rendering module 210, the availability status signal in response to the check availability signal. In some examples, the availability status signal is received by communication circuitry 215.

At block 816, the VVU system 200 is configured to output, at the rendering module, an availability status to the user interface. In some examples, property determination circuitry 217 is configured to determine the availability of the user selected data item from the availability status signal and indicate the availability to the user by outputting the availability to the user via user interface circuitry 213 and rendering circuitry 214. For example, property determination circuitry 227 may determine from the availability status signal the ticket identification data and an indication that the ticket still available for purchase. In some examples, the rendering circuitry, such as rendering circuitry 214, will then render the availability in order to indicate to the user that the ticket is still available. For example, user interface circuitry may present to the user that the ticket is ready to be purchased or proceed through a checkout process. In one example, the checkout process is multiphase process which separates the creation and "holding" of the data items in both the rendering module and verification module, from the charging the user such as charging a user credit card and committing the transaction. This checkout process may include built in protections for errors and outages with downstream systems and detection and handling of errors or state inconsistencies. For example, auto-canceling an order when fulfillment fails on the partner. In a further example, the checkout process may include nested custom fields. These field may supports storing custom input fields, pre-filling fields based on user data and the user selection, and validating data formats of inputs supplied by users during the checkout process. The input field is used by the rendering module for multiple users and in relation to multiple verification modules.

At block 818, the VVU system 200 is configured to receive, at the rendering module 210, a confirm selection input from the user interface, wherein the confirm selection input is triggered by a further user selection of the renderable data object. For example, the user may further select the renderable data object representing a concert ticket presented as ready to be purchased such as an option to proceed to checkout. In some examples, user interface circuitry 213 is configured to receive the further user selection.

At block 820, the VVU system 200 is configured to transmit, at the rendering module 210, a reserved status signal in response to the receiving the confirm selection input. In some examples, the reserved status signal is transmitted by communication circuitry 215. In some examples, the reserve signal indicates that the user has further selected or selected to purchase the available concert ticket At block 822, the VVU system 200 is configured to receive, at the verification module 220, the reserved status signal from the rendering module. In some examples, the reserved status signal is received by communication circuitry 225.

At block 824, the VVU system 200 is configured to update, at the verification module 220, the data item database to indicate a reserved status for a data item associated with the renderable data object upon receiving the reserved status signal. In some examples, processing circuitry such as property determination circuitry 227 is configured to determine a data item to reserve from the reserve signal. For example, property determination circuitry 227 may determine from the reserve signal the data item representing concert ticket has been selected for purchase and should be flagged as reserved. In some examples, processing circuitry such as reservation circuitry 223 is configured to flag the data item in the database as reserved. For example, reservation circuitry 223 may flag the corresponding data item representing the concert ticket as reserved in the data item database 56. In some examples, the item may not be a unique item, for example a concert ticket is part of a general admission concert ticket pool, and thus reservation circuitry 223 may only flag one data item of a pool of data items representing concert tickets as reserved. In some examples, the item is a unique item, such a specific seat at a concert, thus reservation circuitry 223 may flag the unique item as reserved.

At block 826, the VVU system 200 is configured to receive, at the rendering module 210, a payment indication signal. In some examples, user interface circuitry 213 is configured to receive user input which may include payment information. In some examples, receiving payment information may occur simultaneously with block 818 with the confirm selection input. In some examples, payment circuitry 218 is configured to determine payment information from the user input. For example, payment circuitry 218 may determine a credit card number and billing address from the user input. In some examples, the user payment information is stored as part of a user payment profile stored in memory 212 or another accessible database. In some examples, payment circuitry 218 is configured to receive or capture payment by charging a credit card for a cost of the user selected data item, such as the cost of the concert ticket and transmitting a payment indication signal. In some examples, payment may be processed remotely from the rendering module such that the payment indication signal is received by communication circuitry 215.

At block 828, the VVU system 200 is configured to transmit, at the rendering module 210, a fulfill status signal in response to receiving the payment indication signal. In some examples, communication circuitry 215 is configured to transmit the fulfill status signal upon successful receipt of the payment indication signal indication completion of the payment being captured. For example, if a credit card transaction fails, the payment indication signal and thus the fulfill signal may not be transmitted, or is transmitted to include an indication to not fulfill the fulfill data object.

At block 830, the VVU system 200 is configured to receive, at the verification module 220, the fulfill status signal from the rendering module. In some examples, the fulfill signal is received by communication circuitry 225.

At block 832, the VVU system 200 is configured to transmit, at the verification module 220, a fulfill order signal in response to receiving the fulfill status signal. In some examples, processing circuitry such as property determination circuitry 227 is configured to determine the payment status from the fulfill status signal. For example, property determination circuitry 227 may determine from the fulfill signal the data item(s) representing the concert ticket has been paid for and is ready for fulfillment. In some examples, processing circuitry such as fulfillment circuitry 228 is configured to mark the flagged item as ready for fulfillment. For example, fulfillment circuitry 228 may mark the flagged corresponding concert ticket as ready for fulfillment. In some examples, the verification module is then configured to fulfill the order by delivering the inventory represented by the data item stored in data item database 56 to the user. For example, verification module 220 may deliver an electronic copy of the data item, such as an electronic concert ticket. In some examples, if the data item is tied to a physical item, such as a paper copy of the concert ticket, the verification module, such as verification module 220 is configured to deliver the physical object by shipping or mailing the concert ticket to the user. In some examples, rendering module 210 is configured to determine what information (if any) is required from the user for fulfillment purposes. For example, for a shipped ticket the ticket holder name and shipping address would be collected at the rendering module 210 and provided to verification module 220. In the example of an electronic ticket, the name and email address for fulfillment is collected.

In one example, communication circuitry 225, is configured to transmit the fulfill order signal with the concert ticket identification data and an indication that the data item representing the concert ticket is fulfilled when it has been delivered to the user. As discussed in relation to FIG. 7, several other indications of the status of the inventory data item or reservation are possible, such as "fulfilling" while the verification module is in the process of fulfilling the order. In some examples, communication circuitry 225, is configured to transmit the fulfill order signal with the concert ticket identification data and an indication that the ticket is "fulfilling" or in the process of being fulfilled when it has been shipped.

In some examples, the fulfill order signal is received by communication circuitry 215. In some examples, processing circuitry such as property determination circuitry 217 is configured to determine a fulfillment status from the fulfill order signal. For example, property determination circuitry 217 may determine from the fulfilled data object the concert ticket has been fulfilled or has been deliver to the user. In some examples, the fulfillment status is presented to the user through user interface circuitry 213.

In some example embodiments, security circuitry 216 is configured to add security encryption, at the rendering module 210, to the check availability signal, to the reserved status signal, and to the fulfill status signal and parse security encryption, at the rendering module 210, of the availability status signal and of the payment indication signal In some example embodiments, security circuitry 226 is configured to parse security encryption, at the verification module, of the check availability signal, of the reserved status signal, and of the fulfill status signal, and add security encryption, at the verification module, to the availability status signal and to the payment indication signal.

FIG. 9 illustrates another example flowchart of a method for a VVU system. In some examples, a VVU system comprises VVU system 200. At block 902, the VVU system 200 is configured to determine, at the verification module 220, that the data item associated with the renderable data object includes one or more input fields. In some examples, property determination circuitry, such as property determination circuitry 227, is configured to determine from the data item database 56 if the data item is associated with the one or more input fields, such as stored checkout fields.

In block 904, the VVU system 200 is configured to derive, at the verification module 220, the one or more input fields from the data item database. In some examples, property determination circuitry, such as property determination circuitry 227, is configured to derive or lookup the corresponding one or more input fields from the data item database if the determined data item is associated with the stored input fields.

At block 906, the VVU system 200 is configured to transmit, at the verification module 220, the one or more input fields as a component of the availability status signal. For example, property determination circuitry 227 may determine that a concert ticket is available for purchase and is associated with inputs fields. Communication circuitry 225, may then be configured to transmit the ticket identification data and an indication that the ticket still available for purchase along with input fields such as name and email of the concert goer. In other examples, the ticket may not be available or is currently reserved, thus nested element circuitry 224 will transmit the availability status signal with an indication of the determined availability, such as not available for purchase.

At block 908, the VVU system 200 is configured to receive, at the rendering module 210, the one or more input fields with the availability status signal. In some examples, the availability status signal with the input fields is received by communication circuitry 215.

At block 910, the VVU system 200 is configured to render, at the rendering module 210, the one or more input fields as part of the user interface. In some examples, property determination circuitry 217 is configured to determine the availability of the user selected data item from the availability status signal and indicate the availability to the user. For example, property determination circuitry 217 may determine from the availability status signal the ticket identification data and an indication that the ticket still available for purchase. The rendering circuitry 214 will then render an indication to indicate to the user that the ticket is still available. For example, user interface circuitry may present the indication to the user that the ticket is ready to be purchased or proceed through a checkout process. In some examples, user interface circuitry 213 is configured to render the one or more input fields as part of the user interface. In some examples wherein the one or more inputs fields when rendered as part of the user interface comprises one or more of: a text input field, a selectable input field, a drop down menu field, or a radio button field.

At block 912, the VVU system 200 is configured to receive, at the rendering module 210, a further user input wherein the further user input includes user input information in the rendered one or more input fields and an input field user selection of the renderable data object. For example, the user may further select a renderable data object representing a concert ticket presented as ready to be purchased such as an option to proceed to checkout. The user may also enter in the name and email address of the concert goer into input fields on the user interface. In some examples, user interface circuitry 213 is configured to receive the further user selection and information in the user input fields. In one example, the VVU system 200 is configured to proceed through a multiphase checkout process which separates the reservation of the data items in both the rendering module 210 and the verification module 220, from the payment process such as charging the user such as charging a user credit card and committing the transaction. This checkout process may include built in protections for errors and outages with downstream systems and detection and handling of errors or state inconsistencies. For example, auto-canceling an order when fulfillment fails on the partner. In some examples, the rendering module 210 may store certain information related to a user, such as a user's name, address, email, phone number, etc. The rendering module 210 may then be configured to pre-fill the stored information into the input fields, so that a user does not have input the information again. In some examples, the rendering module is configured to pre-fill the input fields rendered from input fields from multiple different verification modules.

At block 914, the VVU system 200 is configured transmit, at the rendering module 210, the user input information in the rendered input fields as an input fields user input signal. In some examples, communication circuitry 215 is configured to transmit the user input signal along with the reserve signal. For example, communication circuitry 215 may transmit a reserve signal indicating that the user has further selected or selected to purchase the available concert ticket along with the user input from the input fields.

At block 916, the VVU system 200 is configured to receive, at the verification module 220, the input fields user input signal. In some examples, the user input information is received by communication circuitry 225.

At block 918, the VVU system 200 is configured to store, at the verification module, one or more input field responses in the data item database. For example, reservation circuitry 223 may store the name and email of the concert goer. As a further example, reservation circuitry 223 may flag the corresponding data item representing the concert ticket as reserved in the data item database 56. In some examples, other indications such as ready for payment or fulfillment may also be included as further data indications in the reserved data object. In some examples, the one or more input field responses comprises one or more of: a group selection, Booleans, an email, a phone number, a textual input; or a numerical input. In some examples, the stored input field response may be used in a subsequent transaction, such that the input fields are not required to be rendered to the user by rendering module 210 and can instead be prefilled by the stored information at verification module 220.

FIG. 10A illustrates an example flow chart of an additional method for a VVU system. In some examples, a VVU system comprises VVU system 200. At block 1002, the VVU system 200 is configured to receive, at the rendering module 210, a cancel user input, wherein the cancel user input includes a cancel selection of the renderable data object. In some examples, the cancel user input can be received through user interface circuitry 213. In some examples, the cancel selection of a renderable data object may comprise selecting a portion of the data object corresponding to cancel option to change the value of a reserved or fulfilled data object to a cancelled status. For example, the user may select an option corresponding to a cancel option for a data item representing a concert ticket.

At block 1004, the VVU system 200 is configured to transmit, at the rendering module 210, a cancel signal including an identified data item represented by the selected renderable data object to be cancelled. In some examples, the cancel signal is transmitted by communication circuitry 215. In some examples, the cancel signal may comprise an identification of a "reserved" or "fulfilled" inventory data item corresponding to the renderable data object. For example, the cancel signal may comprise an identification of a concert ticket selected by the user and an indication of a user's selection to cancel the purchase of the data item representing the concert ticket.

At block 1006, the VVU system 200 is configured to receive, at the verification module, the cancel signal. In some examples, the cancel signal is received by communication circuitry 225.

At block 1008, the VVU system 200 is configured to determine, at the verification module 220, a cancellation status of the identified data item in the data item. In some examples, processing circuitry such as property determination circuitry 227 is configured to determine a cancellation status of data item from the cancel signal. For example, property determination circuitry 227 may determine from the cancel signal the user has selected to cancel the concert ticket. In some examples, the property determination circuitry 227 is configured to determine if the identified data item is eligible for cancellation. For example, if a data item has been fulfilled or if a specific period of time has passed, the identified data item stored in data item database 56 may not be eligible for cancellation.

At block 1010 the VVU system 200 is configured to mark, at the verification module 220, the identified data item in the data item database as cancelling. In some examples, if the inventory data item is eligible to be cancelled, reservation circuitry 223 will mark the corresponding data item in the data item database as cancelled. For example, the concert ticket is changed from "reserved" or "fulfilling" to "cancelling" and "cancelled" in relation to the states of FIG. 7. In some examples, rendering module 210 is configured to force a cancel/refund. For example, if the item is not eligible to be cancelled at the verification module 220, but a customer service representative or administrator has determined that a cancel should be allowed, the rendering module 210 may indicate a cancellation to the user even if verification module 220 does not indicate the data item as cancelled. Additionally, in some examples, rendering module 210 is configured to compare the status of the data item in the verification module and in the rendering module, and will attempt an automatic cancellation to bring the systems in sync. Finally, in some examples, error or exception states may trigger an automatic cancel in the VVU system. For example, if fulfillment fails in a non-recoverable way, then the reservation will be canceled in both verification module 220 and the rendering module 210 and the user refunded their money.

At block 1012, the VVU system 200 is configured to transmit, at the verification module 220, the cancelling status signal, including the cancellation status of the data item and receive, at the rendering module, a cancelling status signal. In some examples, the cancelling status signal is transmitted by communication circuitry 225. In some examples, the cancelling status signal may comprise an identification of a data item and its current cancellation status. For example, the cancelling status signal may comprise data items containing an identification of a concert ticket selected by the user and an indication that the concert ticket is "cancelling" or "cancelled". In some examples, the cancelling status signal is received by communication circuitry 215.

At block 1014, the VVU system 200 is configured to determine, at the rendering module, the cancellation status of the user cancel selected renderable data object from the cancelling status signal. In some examples, processing circuitry such as property determination circuitry 217 is configured to determine a cancellation status from the cancelling status signal. For example, property determination circuitry 217 may determine from the cancelling data object the concert ticket has been cancelled, is being cancelled, or is not eligible for cancellation. In some examples, the cancellation status is presented to the user through user interface circuitry, such as user interface circuitry 213.

FIG. 10B illustrates an example flow chart of an additional method for a VVU system. In some examples, a VVU system comprises VVU system 200. At block 1052, the VVU system 200 is configured to receive, at the rendering module 210, a retrieve user input, wherein the retrieve user input includes a retrieve selection of the renderable data object. In some examples, the retrieve user input is received through user interface circuitry 213. In some examples, the retrieve selection of a renderable data object comprises selecting a rendered option corresponding to retrieve option to retrieve an order status. For example, the user may select a data item corresponding to an order status for a data item representing a concert ticket.

At block 1054, the VVU system 200 is configured to transmit, at the rendering module 210, a retrieve status signal including the identified data item represented by the selected renderable data object to determine a current status. In some examples, the retrieve status signal is transmitted by communication circuitry 215. In some examples, the retrieve status signal may comprise an identification of a "reserved," "fulfilled," or "cancelled" data item stored in a data item database. For example, the retrieve status signal may comprise data items containing an identification of a concert ticket selected by the user and an indication of a user's selection to retrieve the order status of the concert ticket.

At block 1056, the VVU system 200 is configured to receive, at the verification module 220, the retrieve status signal. In some examples, the retrieve signal is received by communication circuitry 225.

At block 1058, the VVU system 200 is configured to determine, at the verification module 220, the current status of the identified data item in the data item. In some examples, processing circuitry such as property determination circuitry 227 is configured to determine the current status of the identified data item. For example, property determination circuitry 227 may determine from the retrieve status signal the user has selected to retrieve the current status of the data item representing the concert ticket. In some examples, the property determination circuitry 227 is configured to determine the current status of the corresponding data item stored in the data item database. For example, an order status is any of the block states as represented in FIG. 7. For example, if the concert ticket has been delivered to the user, the order status of the data item representing the concert ticket will be "fulfilled" as represented in block 750 of FIG. 7.

At block 1060, the VVU system 200 is configured to transmit, at the verification module 220, a current status signal, including the current status of the identified data item. In some examples, the current status signal is transmitted by communication circuitry 225. In some examples, the current status signal may identify an inventory data item and its determined order status. For example, they current status signal comprises an identification of the concert ticket selected by the user and an indication of the concert tickets' current order status, such as "fulfilled."

At block 1062, the VVU system 200 is configured to receive, at the rendering module, the current status signal. In some examples, the current status signal is received by communication circuitry 215.

At block 1064, the VVU system 200 is configured to determine, at the rendering module 210, the current status of the user selected renderable data object from the current status signal. In some examples, processing circuitry such as property determination circuitry 217 is configured to determine the current status or order status from the current status signal. For example, property determination circuitry 217 may determine from the current status signal the concert ticket has been fulfilled or delivered. In some examples, the current status or order status is presented to the user through user interface circuitry 213.

FIG. 11 illustrates an example flow chart of an additional method according to some embodiments. In some examples, FIG. 11 is an example method to provide security and user identification in a VVU system 200. In some example embodiments, a check availability signal may include further security options to protect user identification. In some examples, this further security option can include an email hash. For example, a verification module (i.e. partner or provider) may have an existing account or purchases for a given user email address. Rendering module 210 will send a hashed version of the user email to the verification module (i.e. partner or provider) to support looking up existing information about the user (purchaser). For example, this can be used in the check availability signal to enforce purchase quantity limits for a user even if they have purchased separately on the partner system. As a further example, it can also be used on the reserve signal to associate the purchase with an existing user account, or to fail the request if that user has exceeded purchase limits. In some examples, the email address will be normalized by removing any leading or trailing whitespace and converting all characters to lowercase. The email address will then be hashed using SHA (Secure Hash Algorithm) 256.

At step 1102 a check availability signal is sent from the rendering module to the verification module wherein the check availability signal includes encrypted user information such as an email hash.

At step 1104 the verification module determines determining, at the verification module 220, that the verification module 220 can identify a user from encrypted user identification contained in the check availability signal. If the verification module 220 cannot identify a user from encrypted user identification contained in the check availability signal, the verification module 220 determines a user specific availability from the data item database and transmits the availability status signal to the rendering module based on the user specific availability at step 1108. The user specific availability may comprise a limited number of products available for purchase to the user represented by the email. If the verification module 220 does not know the email hash, the verification module 220 determines a global availability from the data item database and transmits at the availability status signal to the rendering module based on the global specific availability (or a standard or general availability).

At step 1110 the rendering module will further indicate if the user intends to reserve a product with the email hash. This step can include a further user input such as described in FIGS. 8A-B and the issuance of a reserve signal described in FIGS. 8A-B or a hash reserve signal including a hash user input and the encrypted user identification.

At step 1112 the verification module determines again whether it knows the email hash or encrypted user identification. If it does not know the email hash, the verification module is configured to create a new account with email hash and store customer information associated with the user. The verification module 220 is configured to receive new user identification from the user, store, at the verification module 220, the new user identification, encrypt the stored new user identification; and transmit the reserved signal indicating the flagged item as reserved using the stored new user identification (as described in steps 1114-1122 below). If the email hash is known, the verification module is configured to utilize the stored data related to the known existing account tied with the known email at step 1116. The verification module 220 is also configured to receive a hash reserve signal including a hash user input and the encrypted user identification and transmit the reserved signal indicating the flagged item as reserved using the encrypted user identification.

At step 1118 a reservation is created utilizing the email hash as identification information. In some examples, the reservation may include flagging a data item in a date item database as described in FIG. 8A-B.

At step 1120, if the email is unknown, the user will sign up or input additional information required for the completion of the reservation. The input is received from the rendering module 210 utilizing the user interface circuitry 213.

At step 1122 the verification module is configured to compute an email hash, with the additional user information and store the account information for future user by the verification module.

At step 1124 the verification module determines whether it knows the email hash. If the verification module does know the email hash it utilizes the existing stored account information at step 1126 for further processing. If the verification module does not know the email hash, then the verification module is configured to create a new account with the email hash at step 1128 utilizing steps such as 1114-1122 before further processing.

FIGS. 12A-C illustrates an endpoint flow diagram according to some embodiments of the present invention including a VVU system, such as VVU system 200, including a nested element. In some examples, the endpoints represent endpoints of the VVU system according to the methods referred to in FIG. 13. In some embodiments, the endpoints represent communication and operations of a user selection 1202, a rendering module 210 and verification module 220 as part of VVU system 200. In some examples, user selection 1202 is implemented through user interface circuitry 213. In some example embodiments, nested element circuitry, such as nested element circuitry 224 is embodied as part of a verification module, such as verification module 220. In some examples, FIGS. 12A-C are an example of a nested element being displayed in a user interface, such as an HTML iframe.

In some examples, integrating an offer or product for purchase utilizing a nested element, such as an iframe, allows less custom work for the verification module 220 (i.e. partner or provider) to support transactions under some circumstances. For example, offers in the form of renderable data objects will be represented on a ingestion and rendering platforms such as a website in the same manner as other as other offers are presented, such as in relation to the system and methods described in FIGS. 5A-B, 6, 7, 8A-B, 9, and 10A-B. In some examples, when a user clicks a buy button selecting a renderable data object, a new page will be displayed which will load the partner's iframe, provided from verification module 220, within the page or user interface. The user will then make a selection within the partner's iframe. In some examples, once the selection is confirmed, the partner will process the order within the verification module 220 and return an order identification to the rendering module 210. The rendering module 210 will then make a request to the verification module 220 (i.e. partner or provider system) to load details about the order using the order identification. Afterward, the ingestion and rendering platform, such as through rendering module 210, will send the user to the standard checkout page and display the order details. Once the consumer fills out their information and places their order with the rendering module 210 on the ingestion and rendering platform, then the consumer's credit card will be charged by the rendering module or other payment circuitry. In some examples, after the purchase is complete, the partner or provider may then be paid by the ingestion and rendering platform based on contractual terms.

In FIGS. 12A-12C, rendering module 210 is configured to be in communication with verification module 220. At step 1205, the rendering module is configured to receive a user input from user selection 1202, which is a user selection processed by user interface circuitry 213. At step 1206, the rendering module 210 is configured to transmit an integration request to a verification module such as verification module 220. In some examples, the nested element signal is in response to a user indicting that he or she will be placing an order on an ingestion and rendering platform website or on a client device. For example, a user may click "buy" presented as part of a renderable data object.

At step 1207 a user interface, such as the ingestion and rendering website, which is modified by user interface circuitry 213, is configured to display or show a loading indicator in a portion of the user interface, such as an HTML iframe in a VVU system website. The loading indicator is displayed until the nested element is nested into the user interface. At steps 1208 and 1209 the verification module is configured to load nested element data and apply post loading processing. In some examples, the verification module is configured to load an iframe markup and process the iframe for display at the rendering module. At step 1210 the verification module, such as verification module 220 is configured to transmit a user interface element loaded signal. In some examples, this signal is transmitted when the nested element, such as partner iframe, has completely loaded and any major post-loading content adjustment has finished such as adjustments made at step 1209 (e.g. asynchronously loading in user interface components). In some examples, the element loaded signal may include a user interface nesting element.

At steps 1211 and 1213, the rendering module 210 may adjust a user display utilizing user interface circuitry 213 to integrate the nested element. For example, an ingestion and rendering platform website is adjusted to include an HTML iframe, provided in the loaded nesting element, as part of the website. In some examples, this may include resizing the display such as at step 1211 and presenting the nested element such as the iframe by hiding the loading indicator at step 1213.

At step 1214, the rendering module is configured to receive a user input from user selection 1202, which is a user selection of a data item presented in the nested element and processed by user interface circuitry 213. At steps 1215 and 1216, the user selection of the item in the nested element at step 1214 may trigger the verification module to adjust the nested element by rendering additional details at step 1215 and resizing the nested element based on the selection at step 1216, utilizing nested element circuitry 224. In some examples, the verification module 220 is configured to transmit a content resized signal including the additional details and a resized nesting element. At step 1218 the rendering module may adjust a user display utilizing user interface circuitry 213 to integrate the resized nested element. For example, a VVU system website may readjust the iframe, provided in the resized nesting element as part of the website. As another example, a user may make an initial selection, resulting in more data and user interface elements loaded in and rendered to present the user with more options.

For example, a user may first pick a date from a calendar widget presented as an iframe nested element. The times would then be loaded in, and the view would increase in vertical height (which necessitates a resize of the iframe view). After the user picks a time, available sections (with prices) would then be loaded in and rendered which would once again increase the vertical space to render. There may need to be another resize to accommodate additional details.

At step 1219, rendering module 210 is configured to receive a user input from user selection 1202, which is further a user selection or confirmation of a selection of an item presented in the nested element and processed by user interface circuitry 213.

At step 1220, verification module 220 is configured to record a reservation on the verification module by flagging a data item in data item a database as reserved. At step 1221, verification module 220 is configured to transmit a reserved status signal. In some examples, Steps 1220 and 1221 may signal that a reservation has been successfully placed and the consumer should be sent to a checkout page at the rendering module and be charged for an order corresponding to the selected and confirmed data item. In some examples, the reservation can be for a unique completed or incomplete reservation on the verification module (i.e. partner's or provider's system) or a unique or non-unique selection which the verification module (i.e. partner's or provider's system) can resolve.

At step 1222, the rendering module 210 is configured to transmit a check availability signal. In some embodiments, steps 1222, 1223, and 1224 are used to determine availability and pricing for a specific product and attribute combination in relation to a reservation, as generated at steps 1220 and 1221 by determining availability from a data item database. The availability is based on real-time sources at the verification module. The verification module may also be configured to implement a temporary hold on a data item and return reserved units in the availability status signal.

In some examples, a check availability signal at step 1222 in an iframe interaction, will utilize a complete or incomplete reservation on the verification module 220 for the specified data. For example, a reserved data item from steps 1220 and 1221. In some examples, the rendering module 210 will pass an identification of the reserved data item to the verification module 220. In some examples, such as in an iframe implementation, the identification is passed as a URL parameter, with a different name to avoid confusion with an identification for the subsequent reserve signal, as the verification module may or may not choose a different identification for the data item on a subsequent reserve signal. In some examples, the verification module 220 will return the relevant booking details in an availability signal at step 1224, even if no identification exists yet for the reserved unit.

At step 1225, the rendering module 210 is configured to display and process a user checkout. In some examples, this may include a user further selecting a product for purchase and entering information such as address, payment, and other identification information. In some examples, this information is stored on for further use by a rendering module Steps 1226-1232 is substantially similar to steps 510-522 of FIG. 5A. At step 1213, payment received from the user is remitted or transmitted to the partner or provider of the verification module 220 to complete the transaction for the data item.

FIG. 13 illustrates an example flowchart of a method for a VVU system. For example, the method may represent the steps of the endpoint flow diagram of FIGS. 12A-12C. In some examples, a VVU system comprises VVU system 200. At block 1302, the VVU system 200 is configured to Transmit, at the rendering module, an integration request in response to a user selection of an integration selection. In some examples, the user selection of an integration selection can be received through user interface circuitry 213. In some examples, the selection of a renderable data object may comprise selecting a renderable data object corresponding to an offer or product ingested from a flat file module. For example, the user may select a renderable data object corresponding to a concert ticket with an integration selection. In some examples, the concert ticket may include options such as a selectable seat in the concert venue. The seat to be selected by the user through a nested element in the user interface, such as an HTML iframe.

At block 1304, the VVU system 200 is configured to receive, at the verification module 220, the integration request. In some examples, the integration request is received by communication circuitry 225.

At block 1306, the VVU system 200 is configured transmit, at the verification module 220 and in response to the integration request, a user interface nesting element comprising at least one or more selectable items. In some examples, nested element circuitry, such as nested element circuitry 224 is configured to create the user interface nesting element with any necessary properties to display the nesting element in a user interface. For example, nested element circuitry 224, is configured to create the user interface nesting element with content and display properties configured as an iframe window for displaying a concert venue with user selectable data items representing potential seats the user may select for purchase.

At block 1308, the VVU system 200 is configured to receive, at the rendering module 210, the user interface nesting element. In some examples, the user interface nesting element is received by communication circuitry 215.

At block 1310, the VVU system 200 is configured to integrate, at the rendering module 210, the user interface nesting element into the user interface and present at least the one or more selectable items. In some examples, processing circuitry such as user interface circuitry 213 is configured to integrate the user interface nesting element into the user interface. For example, user interface circuitry 213 may open an HTML iframe on a ingestion and rendering platform 14 website or on client device and integrate the iframe data items to be displayed inside of the nested iframe on the website or client device. For example, user interface circuitry 213 may integrate an iframe representing a concert venue and display a plurality of data items representing seats in the venue available for selection by the user.

At block 1312, the VVU system 200 is configured to receive, at the rendering module 210, a nested user selection of one or more of the one or more selectable items. In some examples, the user input can be received through user interface circuitry 213. In some examples, the nested user selection may comprise selecting a data item corresponding to a seat selected by the user through a nested element in the user interface, such as the nested HTML iframe.

At block 1314, the VVU system 200 is configured to transmit, at the rendering module, a user selection signal indicating the nested user selection. In some examples, communication circuitry 215, is configured to transmit the user selection signal including the nested user selection. For example, communication circuitry 215, is configured to transmit the data item representing a seat selected by a user in the nested HTML iframe. In some examples, rendering module 210 is configured to transmit the user selection directly to the verification module 220.

At block 1316, the VVU system 200 is configured to receive, at the verification module 220, the user selection signal. In some examples, the user selection is received by communication circuitry 225.

At block 1318, the VVU system 200 is configured to Determine, at the verification module, the data item to reserve from the nested user selection signal. In some examples, processing circuitry such as property determination circuitry 227 is configured to determine the data item to check a reserve status. For example, property determination circuitry 227 may determine from the user selection data object the concert ticket and seat selected by the user and determine that item is ready to be reserved at the verification module 220.

In some examples, the VVU system 200 is further configured to flag, at the verification module 220, the data item to reserve as reserved in the data item database. In some examples, processing circuitry such as reservation circuitry 223 is configured to flag the item in the data item database as reserved. In some examples, the reserved status is a temporary, such as time limited, reserved status. For example, reservation circuitry 223 may flag the corresponding data item representing a concert ticket and user selected seat as reserved in the data item database.

In some examples, the process then proceeds as described in FIGS. 12A-12C and FIGS. 8A-8B As described above, FIGS. 4A-B, 8A-B, 9, 10A-B, and 13 illustrate flowcharts of systems and methods according to example embodiments of the invention. It will be understood that each block of the flowcharts, and combinations of blocks in the flowcharts, is implemented by various means, such as hardware, firmware, processor, circuitry, and/or other devices associated with execution of software including one or more computer program instructions. For example, one or more of the procedures described above is embodied by computer program instructions. In this regard, the computer program instructions which embody the procedures described above is stored by the memory, such as non-transitory computer-readable storage medium, in the referenced device of FIGS. 1A-B and 2A-B of the systems employing embodiments of the present invention and executed by the various processors of the systems. As will be appreciated, any such computer program instructions is loaded onto a computer or other programmable apparatus (e.g., hardware) to produce a machine, such that the resulting computer or other programmable apparatus implements the functions specified in the flowcharts blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts blocks. As described above these apparatuses may comprise at least one processor and at least one memory including computer program code, the at least one memory and the computer program code configured to, with the at least one processor, cause the apparatus to perform the functions of the flowchart blocks above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions such as program code instructions.

In some embodiments, certain ones of the operations above is modified or further amplified. Furthermore, in some embodiments, additional optional operations is included. Modifications, additions, or amplifications to the operations above is performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions is provided by alternative embodiments without departing from the scope of the appended claims. In this regard, for example, different combinations of elements and/or functions than those explicitly described above are also contemplated as is set forth in some of the appended claims. Although specific terms are employed herein, they are used in a generic and descriptive sense only and not for purposes of limitation.

The invention claimed is:

1. A verification, validation, and updating (VVU) system for updating a data item database comprising a user interface, a rendering module, and a verification module, wherein:
   the rendering module comprises a rendering processor and a rendering memory including rendering computer program code, the rendering memory and the rendering computer program code configured to, with the rendering processor, cause the rendering module to:
      receive a select input from the user interface, wherein the select input is triggered by a user selection of a renderable data object via the user interface;
      determine that the renderable data object associated with the select input is externally sourced and represents a data item stored remotely in an external object database associated with a data item provider platform;
      transmit an integration request in response to a user selection of an integration selection, wherein the integration selection is associated with the renderable data object;
      receive a user interface nesting element;
      integrate the user interface nesting element into the user interface and present at least one or more selectable items to a user;
      receive a nested user selection of one or more of the one or more selectable items;

transmit a user selection signal indicating the nested user selection;
upon determining that the renderable data object is externally sourced, transmit a check availability signal comprising one or more user purchase parameters relating to the select input, wherein at least one user purchase parameter of the one or more user purchase parameters comprises encrypted user information, receive an availability status signal in response to the check availability signal, and output an availability status to the user interface;
receive a confirm selection input from the user interface, wherein the confirm selection input is triggered by a further user selection of the renderable data object;
transmit a reserved status signal in response to the receiving the confirm selection input;
receive a payment indication signal; and
transmit a fulfill status signal in response to receiving the payment indication signal; and
wherein the verification module comprises a verification processor and a verification memory including verification computer program code, the verification memory and the verification computer program code configured to, with the verification processor, cause the verification module to:
receive the integration request;
transmit, in response to the integration request, the user interface nesting element comprising the one or more selectable items;
receive the user selection signal;
determine the data item to reserve from the nested user selection signal;
receive the check availability signal from the rendering module;
determine, based at least in part on the one or more user purchase parameters relating to the select input, real-time availability data corresponding with the select input;
transmit the availability status signal to the rendering module based on the real-time availability data;
receive the reserved status signal from the rendering module;
update the data item database to indicate a reserved status for a data item associated with the renderable data object upon receiving the reserved status signal;
receive the fulfill status signal from the rendering module; and
transmit a fulfill order signal in response to receiving the fulfill status signal.

2. The VVU system of claim 1, wherein the verification module is further configured to:
determine that the data item associated with the renderable data object includes one or more input fields;
derive the one or more input fields from the data item database;
transmit the one or more input fields as a component of the availability status signal;
receive an input fields user input signal; and
store one or more input field responses in the data item database; and
wherein the rendering module is further configured to:
receive the one or more input fields with the availability status signal;
render the one or more input fields as part of the user interface;
receiving a further user input wherein the further user input includes user input information in the rendered one or more input fields and an input field user selection of the renderable data object; and
transmit the user input information in the rendered input fields as the input fields user input signal.

3. The VVU system of claim 2, wherein the one or more inputs fields when rendered as part of the user interface comprises one or more of:
a text input field;
a selectable input field;
a drop down menu field; or
a radio button field.

4. The VVU system of claim 2, wherein the one or more input field responses comprises one or more of:
a group selection;
Booleans;
an email;
a phone number;
a textual input; or
a numerical input.

5. A method for updating a data item database comprising:
receiving, by a rendering module, a select input from a user interface, wherein the select input is triggered by a user selection of a renderable data object via the user interface;
determining, by the rendering module, that the renderable data object associated with the select input is externally sourced and represents a data item stored remotely in an external object database associated with a data item provider platform;
transmitting, by the rendering module, an integration request in response to a user selection of an integration selection, wherein the integration selection is associated with the renderable data object;
receiving, by a verification module, the integration request;
transmitting, by the verification module and in response to the integration request, a user interface nesting element comprising at least one or more selectable items;
receiving, by the rendering module, the user interface nesting element;
integrating, by the rendering module, the user interface nesting element into the user interface and present at least the one or more selectable items;
receiving, by the rendering module, a nested user selection of one or more of the one or more selectable items;
transmitting, by the rendering module, a user selection signal indicating the nested user selection;
receiving, by the verification module, the user selection signal;
upon determining that the renderable data object is externally sourced, transmitting, by the rendering module, a check availability signal comprising one or more user purchase parameters relating to the select input, wherein at least one user purchase parameter of the one or more user purchase parameters comprises encrypted user information;
receiving, by a verification module, the check availability signal from the rendering module;
determining, by the verification module, the data item to reserve from the nested user selection signal;
determining, by the verification module, based at least in part on the one or more user purchase parameters relating to the select input, real-time availability data corresponding with the select input;

transmitting, by the verification module, an availability status signal to the rendering module based on the real-time availability data;

receiving, by the rendering module, the availability status signal in response to the check availability signal, outputting, by the rendering module, an availability status to the user interface;

receiving, by the rendering module, a confirm selection input from the user interface, wherein the confirm selection input is triggered by a further user selection of the renderable data object;

transmitting, by the rendering module, a reserved status signal in response to the receiving the confirm selection input;

receiving, by the verification module, the reserved status signal from the rendering module;

updating, by the verification module, the data item database to indicate a reserved status for a data item associated with the renderable data object upon receiving the reserved status signal;

receiving, by the rendering module, a payment indication signal;

transmitting, by the rendering module, a fulfill status signal in response to receiving the payment indication signal;

receiving, by the verification module, the fulfill status signal from the rendering module; and transmitting, by the verification module, a fulfill order signal in response to receiving the fulfill status signal.

6. The method of claim 5 further comprising:

determining, by the verification module, that the data item associated with the renderable data object includes one or more input fields;

deriving, by the verification module, the one or more input fields from the data item database;

transmitting, by the verification module, the one or more input fields as a component of the availability status signal;

receiving, by the rendering module, the one or more input fields with the availability status signal;

rendering, by the rendering module, the one or more input fields as part of the user interface;

receiving, by the rendering module, a further user input wherein the further user input includes user input information in the rendered one or more input fields and an input field user selection of the renderable data object;

transmitting, by the rendering module, the user input information in the rendered input fields as an input fields user input signal;

receiving, by the verification module, the input fields user input signal; and storing, by the verification module, one or more input field responses in the data item database.

7. The method of claim 6 wherein the one or more inputs fields when rendered as part of the user interface comprises one or more of:
a text input field;
a selectable input field;
a drop down menu field; or
a radio button field.

8. The method of claim 6, wherein the one or more input field responses comprises one or more of:
a group selection;
Booleans;
an email;
a phone number;
a textual input; or
a numerical input.

9. An apparatus for updating a data item database comprising a plurality of data items, the apparatus comprising at least one processor and at least one memory including computer program code, the at least one memory and the computer program code configured to, with the at least one processor, cause the apparatus to:

receive a select input from a user interface, wherein the select input is triggered by a user selection of a renderable data object via the user interface;

determine that the renderable data object associated with the select input is externally sourced and represents a data item stored remotely in an external object database associated with a data item provider platform;

transmit an integration request in response to a user selection of an integration selection, wherein the integration selection is associated with the renderable data object;

receive a user interface nesting element comprising at least one or more selectable items;

integrate the user interface nesting element into the user interface and present at least the one or more selectable items;

receive a nested user selection of one or more of the one or more selectable items; and transmit a user selection signal indicating the nested user selection;

upon determining that the renderable data object is externally sourced, transmit a check availability signal comprising one or more user purchase parameters relating to the select input, wherein at least one user purchase parameter of the one or more user purchase parameters comprises encrypted user information;

receive an availability status signal in response to the check availability signal, wherein the availability status signal is determined based at least in part on real-time availability data corresponding with the select input, and the real-time availability data is based at least in part on one or more user purchase parameters relating to the select input;

output an availability status to the user interface;

receive a confirm selection input from the user interface, wherein the confirm selection input is triggered by a further user selection of the renderable data object;

transmit a reserved status signal in response to the receiving the confirm selection input;

receive the reserved status signal;

update the data item database to indicate a reserved status for a data item associated with the renderable data object upon receiving the reserved status signal;

receive a payment indication signal;

transmit a fulfill status signal in response to receiving the payment indication signal;

receive the fulfill status signal; and transmit a fulfill order signal in response to receiving the fulfill status signal.

10. The apparatus of claim 9, wherein the at least one memory and the computer program code are further configured to, with the at least one processor, cause the apparatus to further:

receive one or more input fields with the availability status signal;

render the one or more input fields as part of the user interface;

receive a further user input wherein the further user input includes user input information in the rendered one or more input fields and an input field user selection of the renderable data object; and transmit the user input information in the rendered input fields as an input fields user input signal.

11. The apparatus of claim 10, wherein the one or more inputs fields when rendered as part of the user interface comprises one or more of:
a text input field;
a selectable input field;
a drop down menu field; or
a radio button field.

12. The apparatus of claim 10, wherein the further user input comprises one or more of:
a group selection;
Booleans;
an email;
a phone number;
a textual input; or
a numerical input.

13. A non-transitory computer-readable storage medium for updating a data item database, the non-transitory computer-readable storage medium storing program code instructions that, when executed, cause a computing device to:
receive a select input from a user interface, wherein the select input is triggered by a user selection of a renderable data object via the user interface;
determine that the renderable data object associated with the select input is externally sourced and represents a data item stored remotely in an external object database associated with a data item provider platform;
transmit an integration request in response to a user selection of an integration selection, wherein the integration selection is associated with the renderable data object;
receive a user interface nesting element comprising at least one or more selectable items;
integrate the user interface nesting element into the user interface and present at least the one or more selectable items;
receive a nested user selection of one or more of the one or more selectable items;
transmit a user selection signal indicating the nested user selection;
upon determining that the renderable data object is externally sourced, transmit a check availability signal comprising one or more user purchase parameters relating to the select input, wherein at least one user purchase parameter of the one or more user purchase parameters comprises encrypted user information;
receive an availability status signal in response to the check availability signal, wherein the availability status signal is determined based at least in part on real-time availability data corresponding with the select input, and the real-time availability data is based at least in part on one or more user purchase parameters relating to the select input;
output an availability status to the user interface;
receive a confirm selection input from the user interface, wherein the confirm selection input is triggered by a further user selection of the renderable data object;
transmit a reserved status signal in response to the receiving the confirm selection input;
receive the reserved status signal;
update the data item database to indicate a reserved status for a data item associated with the renderable data object upon receiving the reserved status signal;
receive a payment indication signal;
transmit a fulfill status signal in response to receiving the payment indication signal receive the fulfill status signal; and
transmit a fulfill order signal in response to receiving the fulfill status signal.

14. The non-transitory computer-readable storage medium of claim 13, wherein the program code instructions, when executed, further cause the computing device to:
receive one or more input fields with the availability status signal;
render the one or more input fields as part of the user interface;
receive a further user input wherein the further user input includes user input information in the rendered one or more input fields and an input field user selection of the renderable data object; and
transmit the user input information in the rendered input fields as an input fields user input signal.

15. The non-transitory computer-readable storage medium of claim 14, wherein the one or more inputs fields when rendered as part of the user interface comprises one or more of:
a text input field;
a selectable input field;
a drop down menu field; or
a radio button field.

16. The non-transitory computer-readable storage medium of claim 14, wherein the further user input comprises one or more of:
a group selection;
Booleans;
an email;
a phone number;
a textual input; or
a numerical input.

* * * * *